(12) United States Patent
Ai et al.

(10) Patent No.: US 12,205,305 B2
(45) Date of Patent: Jan. 21, 2025

(54) INFORMATION PROCESSING METHOD AND SYSTEM

(71) Applicant: ZHEJIANG PIXFRA TECHNOLOGY CO., LTD., Hangzhou (CN)

(72) Inventors: Chenghan Ai, Hangzhou (CN); Keqiang Yu, Hangzhou (CN); Song Wang, Hangzhou (CN); Xiaomu Liu, Hangzhou (CN); Hainian Sun, Hangzhou (CN)

(73) Assignee: ZHEJIANG PIXFRA TECHNOLOGY CO., LTD., Hangzhou (CN)

( * ) Notice: Subject to any disclaimer, the term of this patent is extended or adjusted under 35 U.S.C. 154(b) by 496 days.

(21) Appl. No.: 17/588,213

(22) Filed: Jan. 29, 2022

(65) Prior Publication Data

US 2022/0156949 A1 May 19, 2022

Related U.S. Application Data

(63) Continuation of application No. PCT/CN2019/129933, filed on Dec. 30, 2019.

(30) Foreign Application Priority Data

Aug. 2, 2019 (CN) .......................... 201910713278.6

(51) Int. Cl.
*G06T 7/254* (2017.01)
*G06T 3/4069* (2024.01)
(Continued)

(52) U.S. Cl.
CPC ............ *G06T 7/254* (2017.01); *G06T 3/4069* (2013.01); *G06T 5/10* (2013.01); *G06T 5/70* (2024.01);
(Continued)

(58) Field of Classification Search
CPC ......... G06T 7/254; G06T 3/4069; G06T 5/10; G06T 5/70; G06T 9/004;
(Continued)

(56) References Cited

U.S. PATENT DOCUMENTS

| | | | |
|---|---|---|---|
| 9,131,073 B1* | 9/2015 | Bankoski | ............... H04N 19/86 |
| 2013/0242198 A1* | 9/2013 | Lee | ......................... H04N 5/213 |
| | | | 348/618 |

(Continued)

FOREIGN PATENT DOCUMENTS

| | | |
|---|---|---|
| CN | 103218792 A | 7/2013 |
| CN | 103905692 A | 7/2014 |

(Continued)

OTHER PUBLICATIONS

Infrared image fringe noise removal method based on guided filtering.

(Continued)

*Primary Examiner* — Ping Y Hsieh
*Assistant Examiner* — Vaisali Rao Koppolu

(57) ABSTRACT

The present disclosure is related to systems and methods for noise reduction. The method includes obtaining a current frame including a plurality of first pixels. The method includes determining an interframe difference between each first pixel in the current frame and a corresponding pixel in a previous frame obtained prior to the current frame. The method includes generating a denoised frame by performing a first noise reduction operation on the current frame. The method includes determining an intraframe difference for each second pixel in the denoised frame. The method includes generating a target frame by performing a second noise reduction operation on the denoised frame.

20 Claims, 11 Drawing Sheets

(51) Int. Cl.
  *G06T 5/10* (2006.01)
  *G06T 5/70* (2024.01)
  *G06T 9/00* (2006.01)

(52) U.S. Cl.
  CPC .... *G06T 9/004* (2013.01); *G06T 2207/10016* (2013.01); *G06T 2207/10048* (2013.01)

(58) Field of Classification Search
  CPC . G06T 2207/10016; G06T 2207/10048; G06T 5/73; G06T 2207/10024; G06T 2207/10116; G06T 2207/20224; G06T 5/50; H04N 25/677; H04N 25/671; H04N 23/81
  See application file for complete search history.

(56) References Cited

U.S. PATENT DOCUMENTS

| | | | | |
|---|---|---|---|---|
| 2014/0192267 | A1* | 7/2014 | Biswas | G06T 7/254 |
| | | | | 348/701 |
| 2018/0061014 | A1* | 3/2018 | Guo | G06T 5/70 |
| 2018/0061015 | A1* | 3/2018 | Guo | G06T 5/20 |
| 2019/0005625 | A1* | 1/2019 | Kuybeda | G06T 5/73 |

FOREIGN PATENT DOCUMENTS

| | | | |
|---|---|---|---|
| CN | 103985089 | A | 8/2014 |
| CN | 104378532 | A | 2/2015 |
| CN | 104782116 | A | 7/2015 |
| CN | 104867122 | A | 8/2015 |
| CN | 104917936 | A | 9/2015 |
| CN | 105957033 | A | 9/2016 |
| CN | 106127705 | A | 11/2016 |
| CN | 104782116 | B | 12/2016 |
| CN | 109360168 | A | 2/2019 |
| CN | 109509158 | A | 3/2019 |
| CN | 109903235 | A | 6/2019 |
| CN | 110445953 | A | 11/2019 |
| WO | WO2017185440 | A1 | 11/2017 |

OTHER PUBLICATIONS

Algorithm for eliminating stripe noise in infrared image.
Chinese First office action, Chinese Application No. 201910713278.6, mailed Mar. 18, 2020 (18 pages).
Notification to Grant Patent Right for Invention, Chinese Application No. 201910713278.6, mailed Oct. 9, 2020 (6 pages).
International search report, International Application No. PCT/CN2019/129933, mailed May 7, 2020 (10 pages).
Dubois E et al: "Noise Reduction in Image Sequences Using Motion-Compensated Tempoal Filtering", IEEE Transactions on Communications, IEEE Service Center, Piscataway, NJ. USA, vol. COM-32, No. 7, Jul. 1, 1984, pp. 826-831, XP001024707.
Misawa Z et al: "A Proposed Computer-Controlled Digital HDTV Chroma-Key System",SMPTE—Motion Imaging Journal, Society of Motion Picture and Television Engineers, White Plains, NY, US,vol. 104, No. 3, Mar. 1, 1995 , pp. 134-138, XP000495986.
European Search Report,EP19940757.8,mailed Nov. 4, 2022(8 pages).

* cited by examiner

INFORMATION PROCESSING METHOD AND SYSTEM

CROSS REFERENCE

This application is a continuation-application of International (PCT) Patent Application No. PCT/CN2019/129933, filed on Dec. 30, 2019, which claims priority of Chinese Patent Application No. 201910713278.6, filed on Aug. 2, 2019, the contents of which are incorporated herein by reference.

TECHNICAL FIELD

This present disclosure generally relates to systems and methods for image processing, and in particular, to systems and methods for noise reduction in images.

BACKGROUND

Infrared imaging devices (e.g., thermal imagers) often use an array of infrared sensors to capture thermal images (or image frames). However, a thermal image is often interfered with noises that are substantially correlated to rows and/or columns of infrared sensors. For example, row and/or column noises (e.g., stripe noises) manifested as vertical and/or horizontal stripes may be present in image frames. The horizontal or vertical stripes may be consistent in a row (or column) of a same image frame, but may change from frame to frame. The presence of noises in image frames may degrade visual qualities of the frames, and/or subsequent processing effectiveness of the frames. For example, the coding efficiency for the image frames may be significantly decreased by noises.

Conventionally, a temporal domain noise reduction can be performed on image frame(s) to reduce dynamic stripe noises. However, the temporal domain noise reduction is generally performed based on a single pixel correction, and correction amplitudes for different pixels in a same row (or column) may be different. Therefore, the correction effect may be limited, and the stripe noises may not be reduced effectively. In another noise reduction, each pixel in each row (or column) of pixels in an image frame may be compared with a plurality of neighborhood pixels, and a correction term may be determined based on the comparison results. The each row (or column) of pixels may be corrected based on the correction term to reduce stripe noises. However, in such noise reduction process, a pixel in an image frame may be corrected only based on a plurality of neighboring pixels in the image frame. The stripe noises may not be completely removed, and flickering horizontal or vertical stripes may still be present in the image frame, especially when there are similar amplitude noises in continuous rows or columns of the image frame. Thus, it is desirable to provide effective systems and methods for noise reduction.

SUMMARY OF THE DISCLOSURE

According to an aspect of the present disclosure, a method for noise reduction implemented on a computing device having at least one processor and at least one storage device may include one or more of the following operations. The method may include obtaining a current frame including a plurality of first pixels arranged in a plurality of rows and a plurality of columns. The method may include, for each first pixel of the plurality of first pixels in the current frame, determining an interframe difference between the each first pixel in the current frame and a corresponding pixel in a previous frame obtained prior to the current frame. The method may include generating a denoised frame by performing, based on the interframe difference for the each first pixel in the current frame, a first noise reduction operation on the current frame. The denoised frame may include a plurality of second pixels. The method may include determining an intraframe difference for each second pixel of the plurality of second pixels in the denoised frame. The method may include generating a target frame by performing, based on the intraframe difference for the each second pixel in the denoised frame, a second noise reduction operation on the denoised frame.

In some embodiments, the method may include generating a filtered current frame by filtering the current frame using a first filter. The method may include generating a filtered previous frame by filtering the previous frame using a second filter. The method may include determining the interframe difference for the each first pixel in the current frame by subtracting a pixel value of a corresponding pixel in the filtered previous frame from a pixel value of a corresponding pixel in the filtered current frame.

In some embodiments, the first filter may include a first edge-preserving filter, and/or a first window size of the first filter may be 1×n, n being an integer greater than 1 and no greater than a count of the plurality of columns.

In some embodiments, the second filter may include a second edge-preserving filter, and/or a second window size of the second filter may be m×n, m being an integer greater than 1 and no greater than a count of rows of pixels in the previous frame, and n being an integer greater than 1 and no greater than a count of columns of pixels in the previous frame.

In some embodiments, the method may include designating the filtered current frame as the current frame.

In some embodiments, the method may include determining, based on the interframe difference for the each first pixel in the current frame, a first noise value for each row of first pixels in the current frame. The method may include performing, based on the first noise value for the each row of first pixels in the current frame, the first noise reduction operation on the each row of first pixels in the current frame, to generate the denoised frame.

In some embodiments, the method may include, for each first pixel in the each row of first pixels, performing a first determination of whether the each first pixel in the each row is involved in the determination of the first noise value to generate a first determination result. The method may include, for the each row of first pixels, determining, based on the first determination results for the each row, at least one of a count of first pixels involved in the determination of the first noise value in the each row, or a first sum value of at least one interframe difference for at least one first pixel involved in the determination of the first noise value in the each row. The method may include, for the each row of first pixels, determining a second sum value of multiple interframe differences for multiple first pixels in the each row. The method may include, for the each row of first pixels, performing, based on the second sum value for the each row, a second determination of whether the each row is involved in the first noise reduction operation to generate a second determination result. The method may include determining the first noise value for the each row based on at least one of the second determination result for the each row, the count of first pixels involved in the determination of the first noise value in the each row, or the first sum value for the each row.

In some embodiments, the method may include determining whether an absolute value of an interframe difference for the each first pixel in the each row satisfies a first threshold. The method may include, in response to a determination that an absolute value of an interframe difference for a first pixel in a row of first pixels satisfies the first threshold, determining that the first pixel is involved in the determination of the first noise value for the row.

In some embodiments, the first threshold may be in a range from 0 to 32.

In some embodiments, the method may include determining whether an absolute value of the second sum value for the each row satisfies a second threshold.

In some embodiments, the method may include, in response to a determination that an absolute value of a second sum value for a row of first pixels satisfies the second threshold, determining that the row is involved in the first noise reduction operation.

In some embodiments, the method may include, in response to a determination that an absolute value of a second sum value for a row of first pixels does not satisfy the second threshold, determining that the row is not involved in the first noise reduction operation.

In some embodiments, the method may include, in response to a determination that the each row is involved in the first noise reduction operation, designating a ratio of the first sum value for the each row to the count of first pixels involved in the determination of the first noise value in the each row as the first noise value for the each row.

In some embodiments, the method may include, in response to a determination that the each row is not involved in the first noise reduction operation, designating 0 as the first noise value for the each row.

In some embodiments, the second threshold may be in a range from 0 to 256.

In some embodiments, the method may include generating a filtered denoised frame by filtering the denoised frame using a third filter. The method may include determining the intraframe difference for the each second pixel in the denoised frame by subtracting a pixel value of a corresponding pixel in the filtered denoised frame from a pixel value of the each second pixel in the denoised frame.

In some embodiments, the third filter may include a third edge-preserving filter, and/or a third window size of the third filter may be mxl, m being an integer greater than 1 and no greater than a count of rows of second pixels in the denoised frame.

In some embodiments, the method may include determining, based on the intraframe difference for the each second pixel in the denoised frame, a second noise value for each row of second pixels in the denoised frame. The method may include performing, based on the second noise value for the each row of second pixels in the denoised frame, the second noise reduction operation on the each row of second pixels in the denoised frame, to generate the target frame.

In some embodiments, the method may include, for each second pixel in the each row of second pixels, performing a third determination of whether the each second pixel in the each row is involved in the determination of the second noise value to generate a third determination result. The method may include, for the each row of second pixels, determining, based on the third determination results for the each row, at least one of a count of second pixels involved in the determination of the second noise value in the each row, or a third sum value of at least one intraframe difference for at least one second pixel involved in the determination of the second noise value in the each row. The method may include, for the each row of second pixels, performing, based on a second sum value for a row of first pixels corresponding to the each row, a fourth determination of whether the each row is involved in the second noise reduction operation to generate a fourth determination result. The method may include, determining the second noise value for the each row based on at least one of the fourth determination result for the each row, the count of second pixels involved in the determination of the second noise value in the each row, or the third sum value for the each row.

In some embodiments, the method may include, determining whether an absolute value of an intraframe difference for the each second pixel in the each row satisfies a third threshold. The method may include, in response to a determination that an absolute value of an intraframe difference for a second pixel in a row of second pixels satisfies the third threshold, determining that the second pixel is involved in the determination of the second noise value for the row.

In some embodiments, the third threshold may be in a range from 0 to 32.

In some embodiments, the method may include determining whether an absolute value of a second sum value for the row of first pixels corresponding to the each row satisfies a fourth threshold.

In some embodiments, the method may include, in response to a determination that an absolute value of a second sum value for a row of first pixels corresponding to a row of second pixels satisfies the fourth threshold, determining that the row is involved in the second noise reduction operation.

In some embodiments, the method may include, in response to a determination that an absolute value of a second sum value for a row of first pixels corresponding to a row of second pixels does not satisfy the fourth threshold, determining that the row is not involved in the second noise reduction operation.

In some embodiments, the method may include, in response to a determination that the each row is involved in the second noise reduction operation, designating a ratio of the third sum value for the each row to the count of second pixels involved in the determination of the second noise value in the each row as the second noise value for the each row.

In some embodiments, the method may include, in response to a determination that the each row is not involved in the second noise reduction operation, designating 0 as the second noise value for the each row.

In some embodiments, the fourth threshold may be in a range from 0 to 256.

In some embodiments, the method may include performing, based on the first noise value for the each row of first pixels in the current frame, a brightness correction operation on the target frame.

In some embodiments, the current frame and the previous frame may be from a frame set. The frame set may include an initial frame. The method may include determining an intraframe difference for each pixel of a plurality of pixels in the initial frame. The method may include performing, based on the intraframe difference for the each pixel in the initial frame, a third noise reduction operation on the initial frame.

According to another aspect of the present disclosure, a system for noise reduction may include at least one storage medium storing a set of instructions, and at least one processor in communication with the at least one storage medium. When executing the stored set of instructions, the at least one processor may cause the system to obtain a current frame including a plurality of first pixels arranged in a plurality of rows and a plurality of columns. The at least one processor may also cause the system to, for each first pixel of the plurality of first pixels in the current frame, determine an interframe difference between the each first pixel in the current frame and a corresponding pixel in a previous frame obtained prior to the current frame. The at least one processor may also cause the system to generate a denoised frame by performing, based on the interframe difference for the each first pixel in the current frame, a first noise reduction operation on the current frame. The denoised frame may include a plurality of second pixels. The at least one processor may also cause the system to determine an intraframe difference for each second pixel of the plurality of second pixels in the denoised frame. The at least one processor may also cause the system to generate a target frame by performing, based on the intraframe difference for the each second pixel in the denoised frame, a second noise reduction operation on the denoised frame.

According to still another aspect of the present disclosure, a non-transitory computer readable medium may store instructions. The instructions, when executed by at least one processor, may cause the at least one processor to implement a method. The method may include obtaining a current frame including a plurality of first pixels arranged in a plurality of rows and a plurality of columns. The method may include, for each first pixel of the plurality of first pixels in the current frame, determining an interframe difference between the each first pixel in the current frame and a corresponding pixel in a previous frame obtained prior to the current frame. The method may include generating a denoised frame by performing, based on the interframe difference for the each first pixel in the current frame, a first noise reduction operation on the current frame. The denoised frame may include a plurality of second pixels. The method may include determining an intraframe difference for each second pixel of the plurality of second pixels in the denoised frame. The method may include generating a target frame by performing, based on the intraframe difference for the each second pixel in the denoised frame, a second noise reduction operation on the denoised frame.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

Figure 2:
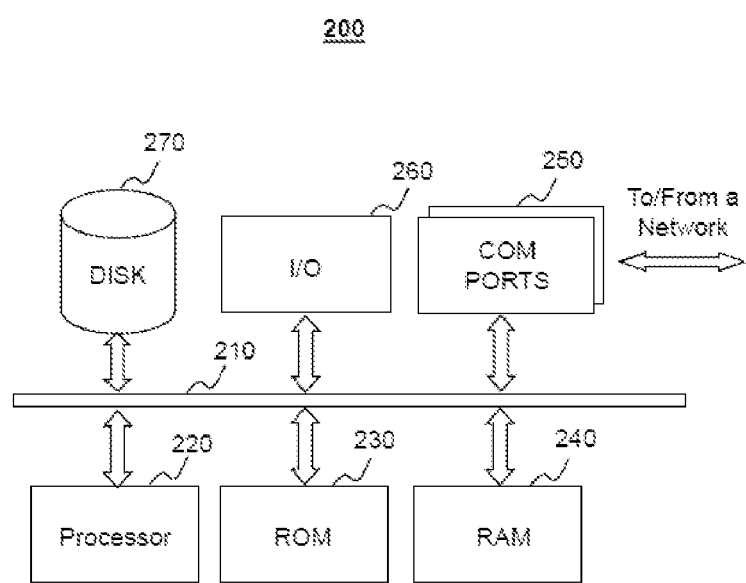
FIG. 2 is a schematic diagram illustrating exemplary hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

These and other features, and characteristics of the present disclosure, as well as the methods of operations and functions of the related elements of structure and the combination of parts and economies of manufacture, may become more apparent upon consideration of the following description with reference to the accompanying drawings, all of which form part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for noise reduction. According to some systems and methods of the present disclosure, a processing device may obtain a current frame including a plurality of first pixels arranged in a plurality of rows and a plurality of columns. For each first pixel of the plurality of first pixels in the current frame, the processing device may determine an interframe difference between the each first pixel in the current frame and a corresponding pixel in a previous frame obtained prior to the current frame. The processing device may generate a denoised frame by performing, based on the interframe difference for the each first pixel in the current frame, a first noise reduction operation (e.g., an interframe noise reduction operation) on the current frame. The denoised frame may include a plurality of second pixels. The processing device may determine an intraframe difference for each second pixel of the plurality of second pixels in the denoised frame. The processing device may generate a target frame by performing, based on the intraframe difference for the each second pixel in the denoised frame, a second noise reduction operation (e.g., an intraframe noise reduction operation) on the denoised frame.

Accordingly, noises (e.g., stripe noises) in a current frame may be determined based on interframe information (or temporal domain information) and intraframe information (or spatial domain information) associated with the current frame. The accuracy of the interframe noise reduction operation and the intraframe noise reduction operation performed on each row (or column) of pixels in the current frame may be improved, and the noise reduction effect of the current frame may further be improved.

Figure 1:
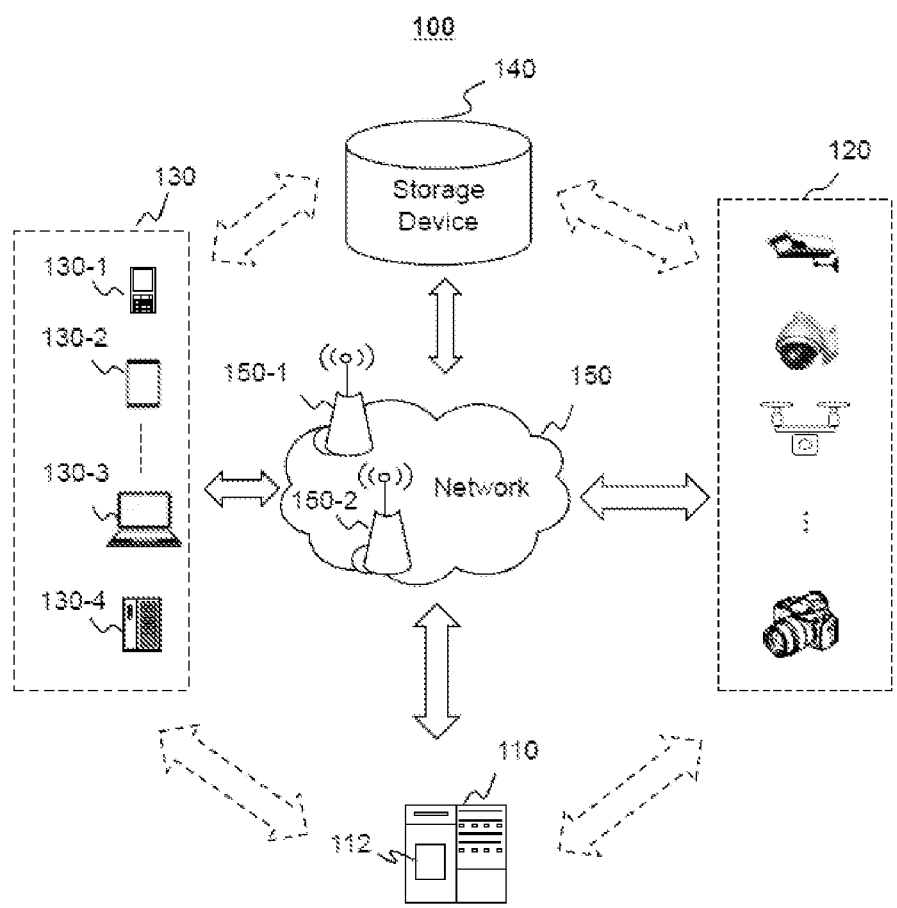
FIG. 1 is a schematic diagram illustrating an exemplary image processing system according to some embodiments of the present disclosure.

FIG. 1 is a schematic diagram illustrating an exemplary image processing system according to some embodiments of the present disclosure. In some embodiments, the image processing system 100 may include a server 110, an image capture device 120, a terminal device 130, a storage device 140, and a network 150. The components of the image processing system 100 may be connected to each other in one or more of various ways. Merely by way of example, the image capture device 120 may be connected to the server 110 through the network 150, or connected to the server 110 directly as illustrated by the bidirectional dotted arrow connecting the image capture device 120 and the server 110 in FIG. 1. As another example, the image capture device 120 may be connected to the storage device 140 through the network 150, or connected to the storage device 140 directly as illustrated by the bidirectional dotted arrow connecting the image capture device 120 and the storage device 140 in FIG. 1. As still another example, the terminal device 130 may be connected to the storage device 140 through the network 150, or connected to the storage device 140 directly as illustrated by the bidirectional dotted arrow connecting the terminal device 130 and the storage device 140 in FIG. 1. As still another example, the terminal device 130 may be connected to the server 110 through the network 150, or connected to the server 110 directly as illustrated by the bidirectional dotted arrow connecting the terminal device 130 and the server 110 in FIG. 1.

In some embodiments, the server 110 may be a single server or a server group. The server group may be centralized or distributed (e.g., the server 110 may be a distributed system). In some embodiments, the server 110 may be local or remote. For example, the server 110 may access information and/or data stored in the terminal device 130, the storage device 140, and/or the image capture device 120 via the network 150. As another example, the server 110 may be directly connected to the image capture device 120, the terminal device 130, and/or the storage device 140 to access stored information and/or data. In some embodiments, the server 110 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof.

In some embodiments, the server 110 may be implemented on a computing device 200 having one or more components illustrated in FIG. 2 in the present disclosure. In some embodiments, the server 110 may be integrated into the terminal device 130. In some embodiments, the server 110 may be integrated into the image capture device 120.

In some embodiments, the server 110 may include a processing device 112. The processing device 112 may process information and/or data to perform one or more functions described in the present disclosure. For example, the processing device 112 may obtain a current frame including a plurality of first pixels arranged in a plurality of rows and a plurality of columns. As another example, for each first pixel of a plurality of first pixels in a current frame, the processing device 112 may determine an interframe difference between the each first pixel in the current frame and a corresponding pixel in a previous frame obtained prior to the current frame. As still another example, the processing device 112 may generate a denoised frame by performing, based on an interframe difference for each first pixel in a current frame, a first noise reduction operation (e.g., an interframe noise reduction operation) on the current frame. As still another example, the processing device 112 may determine an intraframe difference for each second pixel of a plurality of second pixels in a denoised frame. As still another example, the processing device 112 may generate a target frame by performing, based on an intraframe difference for each second pixel in a denoised frame, a second noise reduction operation (e.g., an intraframe noise reduction operation) on the denoised frame. In some embodiments, the processing device 112 may include one or more processing engines (e.g., single-core processing engine(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the server 110 may be connected to the network 150 to communicate with one or more components (e.g., the terminal device 130, the storage device 140, and/or the image capture device 120) of the image processing system 100. In some embodiments, the server 110 may be directly connected to or communicate with one or more components (e.g., the terminal device 130, the storage device 140, and/or the image capture device 120) of the image processing system 100.

The image capture device 120 may be configured to capture one or more images. As used herein, an "image" may refer to a static image, a series of frames, a video, etc. The image may be a two-dimensional image, a three-dimensional image, etc. In some embodiments, the image may further include voice information associated with the image. In some embodiments, the image capture device 120 may include a video camera. As used herein, a video camera may refer to an apparatus for visual recording. In some embodiments, the image capture device 120 may include a spherical camera, a hemispherical camera, a rifle camera, etc. In some embodiments, the image capture device 120 may include a black-white camera, a color camera, an infrared camera, an X-ray camera, etc. In some embodiments, the image capture device 120 may include a digital camera, an analog camera, etc. In some embodiments, the image capture device 120 may include a monocular camera, a binocular camera, a multi-camera, etc.

In some embodiments, the captured images may be processed by the image capture device 120 directly. In some embodiments, the image capture device 120 may transmit the captured images to one or more components (e.g., the server 110, the terminal device 130, the storage device 140) of the image processing system 100 (e.g., via the network 150) for processing.

In some embodiments, the terminal devices 130 may include a mobile device 130-1, a tablet computer 130-2, a laptop computer 130-3, a telephone 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, smart footgear, a smart glass, a smart helmet, a smart watch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a HoloLens, a Gear VR, etc.

The storage device 140 may store data and/or instructions. In some embodiments, the storage device 140 may store data obtained from the terminal device 130, the image capture device 120, the processing device 112, and/or an external storage device. For example, the storage device 140 may store a current frame and/or one or more previous frames obtained from the image capture device 120. As another example, the storage device 140 may store an interframe difference between each first pixel in a current frame and a corresponding pixel in a previous frame determined by the processing device 112. As still another example, the storage device 140 may store a denoised frame determined by the processing device 112. As still another example, the storage device 140 may store an intraframe difference for each second pixel of a plurality of second pixels in a denoised frame determined by the processing device 112. As still another example, the storage device 140 may store a target frame determined by the processing device 112. In some embodiments, the storage device 140 may store data and/or instructions that the server 110 may execute or use to perform exemplary methods described in the present disclosure. For example, the storage device 140 may store instructions that the processing device 112 may execute or use to determine an interframe difference between each first pixel in a current frame and a corresponding pixel in a previous frame. As another example, the storage device 140 may store instructions that the processing device 112 may execute or use to perform, based on an interframe difference for each first pixel in a current frame, a first noise reduction operation (e.g., an interframe noise reduction operation) on the current frame. As still another example, the storage device 140 may store instructions that the processing device 112 may execute or use to determine an intraframe difference for each second pixel of a plurality of second pixels in a denoised frame. As still another example, the storage device 140 may store instructions that the processing device 112 may execute or use to perform, based on an intraframe difference for each second pixel in a denoised frame, a second noise reduction operation (e.g., an intraframe noise reduction operation) on the denoised frame.

In some embodiments, the storage device 140 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 150 to communicate with one or more components (e.g., the server 110, the terminal device 130, and/or the image capture device 120) of the image processing system 100. One or more components of the image processing system 100 may access the data or instructions stored in the storage device 140 via the network 150. In some embodiments, the storage device 140 may be directly connected to or communicate with one or more components (e.g., the server 110, the terminal device 130, and/or the image capture device 120) of the image processing system 100. In some embodiments, the storage device 140 may be part of the server 110.

The network 150 may facilitate exchange of information and/or data. In some embodiments, one or more components (e.g., the server 110, the terminal device 130, the storage device 140, or the image capture device 120) of the image processing system 100 may send information and/or data to other component(s) of the image processing system 100 via the network 150. For example, the server 110 may obtain/acquire one or more frames from one or more image capture devices 120 (e.g., an infrared imaging device). In some embodiments, the network 150 may be any type of wired or wireless network, or combination thereof. Merely by way of example, the network 150 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 150 may include one or more network access points. For example, the network 150 may include wired or wireless network access points (e.g., 150-1, 150-2), through which one or more components of the image processing system 100 may be connected to the network 150 to exchange data and/or information.

It should be noted that the image processing system 100 is merely provided for the purposes of illustration, and is not intended to limit the scope of the present disclosure. For persons having ordinary skills in the art, multiple variations or modifications may be made under the teachings of the present disclosure. However, those variations and modifications do not depart from the scope of the present disclosure. For example, the image processing system 100 may further include a database, an information source, etc. As another example, the image processing system 100 may be implemented on other devices to realize similar or different functions.

FIG. 2 is a schematic diagram illustrating exemplary hardware and/or software components of an exemplary computing device according to some embodiments of the present disclosure. In some embodiments, the server 110, the terminal device 130 may be implemented on the computing device 200. For example, the processing device 112 may be implemented on the computing device 200 and configured to perform functions of the processing device 112 disclosed in this disclosure.

The computing device 200 may be used to implement any component of the image processing system 100 as described herein. For example, the processing device 112 may be implemented on the computing device 200, via its hardware, software program, firmware, or a combination thereof. Although only one such computer is shown, for convenience, the computer functions relating to the image processing as described herein may be implemented in a distributed fashion on a number of similar platforms to distribute the processing load.

The computing device 200 may include COM ports 250 connected to and from a network connected thereto to facilitate data communications. The computing device 200 may also include a processor 220, in the form of one or more, e.g., logic circuits, for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read only memory (ROM) 230, or a random access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computer and other components. The computing device 200 may also receive programming and data via network communications.

Merely for illustration, only one processor is described in FIG. 2. Multiple processors are also contemplated, thus operations and/or steps performed by one processor as described in the present disclosure may also be jointly or separately performed by the multiple processors. For example, if in the present disclosure the processor of the computing device 200 executes both operation A and operation B, it should be understood that operation A and operation B may also be performed by two different CPUs and/or processors jointly or separately in the computing device 200 (e.g., the first processor executes operation A and the second processor executes operation B, or the first and second processors jointly execute operations A and B).

Figure 3:
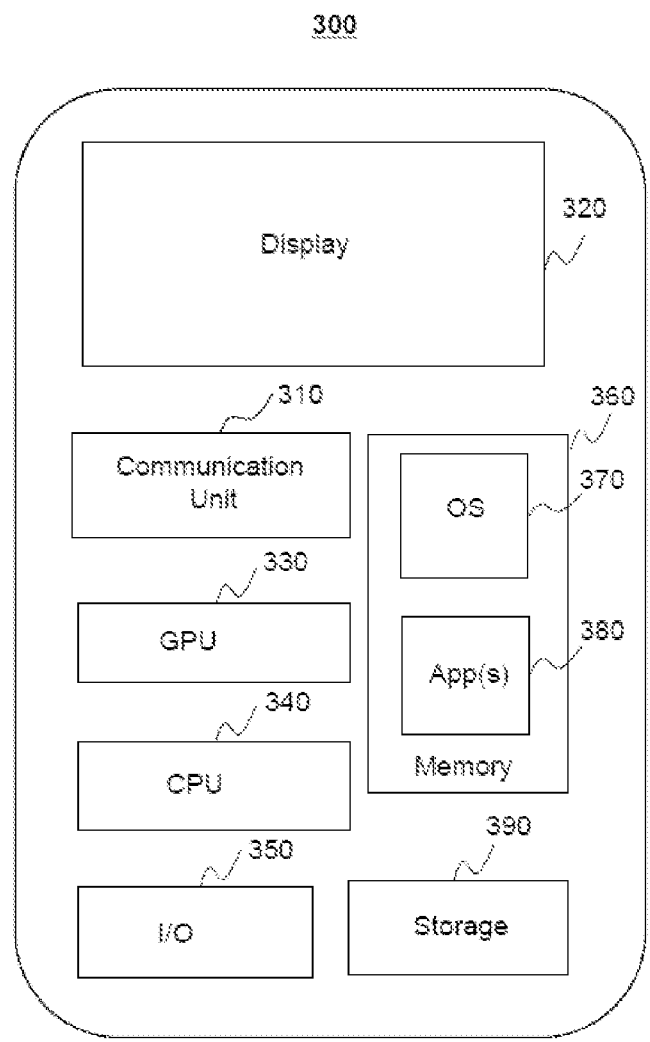
FIG. 3 is a schematic diagram illustrating exemplary hardware and/or software components of an exemplary mobile device on which a terminal device may be implemented according to some embodiments of the present disclosure.

FIG. 3 is a schematic diagram illustrating exemplary hardware and/or software components of an exemplary mobile device on which a terminal device may be implemented according to some embodiments of the present disclosure. In some embodiments, the terminal device 130 may be implemented on the mobile device 300. As illustrated in FIG. 3, the mobile device 300 may include a communication unit 310, a display 320, a graphic processing unit (GPU) 330, a central processing unit (CPU) 340, an I/O 350, a memory 360, a mobile operating system (OS) 370, and a storage 390. In some embodiments, any other suitable component, including but not limited to a system bus or a controller (not shown), may also be included in the mobile device 300.

In some embodiments, the mobile operating system 370 (e.g., iOS™, Android™, Windows Phone™, Harmony OS, etc.) and one or more applications 380 may be loaded into the memory 360 from the storage 390 in order to be executed by the CPU 340. The applications 380 may include a browser or any other suitable mobile app for receiving and rendering information relating to image processing or other information from the image processing system 100. User interactions with the information stream may be achieved via the I/O 350 and provided to the processing device 112 and/or other components of the image processing system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
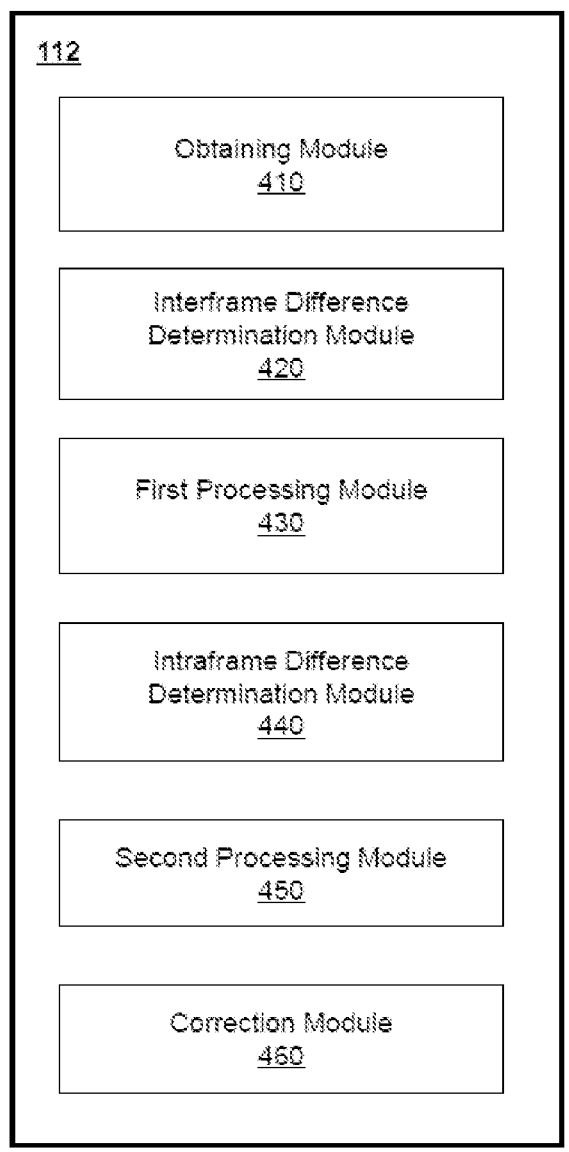
FIG. 4 is a block diagram illustrating an exemplary processing device according to some embodiments of the present disclosure.

FIG. 4 is a block diagram illustrating an exemplary processing device according to some embodiments of the present disclosure. The processing device 112 may include an obtaining module 410, an interframe difference determination module 420, a first processing module 430, an intraframe difference determination module 440, a second processing module 450, and a correction module 460.

The obtaining module 410 may be configured to obtain data and/or information associated with the image processing system 100. In some embodiments, the obtaining module 410 may obtain a frame set. The frame set may include an initial frame, a current frame, and/or one or more previous frames corresponding to the current frame. In some embodiments, the obtaining module 410 may obtain the data and/or the information associated with the image processing system 100 from one or more components (e.g., the image capture device 120, the terminal device 130, the storage device 140) of the image processing system 100 via the network 150.

The interframe difference determination module 420 may be configured to determine an interframe difference between a pixel in a first image and a corresponding pixel in a second image. In some embodiments, for each first pixel of a plurality of first pixels in a current frame, the interframe difference determination module 420 may determine an interframe difference between the each first pixel in the current frame and a corresponding pixel in a previous frame obtained prior to the current frame. For example, the interframe difference determination module 420 may generate a filtered current frame by filtering a current frame using a first filter. The interframe difference determination module 420 may generate a filtered previous frame by filtering a previous frame using a second filter. The interframe difference determination module 420 may determine an interframe difference for each first pixel in the current frame by subtracting a pixel value of a corresponding pixel in the filtered previous frame from a pixel value of a corresponding pixel in the filtered current frame. More descriptions of the determination of the interframe difference may be found elsewhere in the present disclosure (e.g., FIGS. 5, 6, and descriptions thereof).

The first processing module 430 may be configured to generate a denoised frame. In some embodiments, the first processing module 430 may generate a denoised frame by performing, based on an interframe difference for each first pixel in a current frame, a first noise reduction operation on the current frame. For example, for each first pixel in each row of first pixels, the first processing module 430 may perform a first determination of whether the each first pixel in the each row is involved (or to be involved) in the determination of a first noise value and generate a first determination result. For the each row of first pixels, the first processing module 430 may determine, based on the first determination results for the each row, at least one of a count of first pixels involved (or to be involved) in the determination of the first noise value in the each row, and a first sum value of at least one interframe difference for at least one first pixel involved (or to be involved) in the determination of the first noise value in the each row. For the each row of first pixels, the first processing module 430 may determine a second sum value of multiple interframe differences for multiple first pixels in the each row. For the each row of first pixels, the first processing module 430 may perform, based on the second sum value for the each row, a second determination of whether the each row is involved (or to be involved) in the first noise reduction operation and generate a second determination result. The first processing module 430 may determine the first noise value for the each row based on the second determination result for the each row, the count of first pixels involved (or to be involved) in the determination of the first noise value in the each row, and/or the first sum value for the each row. The first processing module 430 may perform, based on the first noise value for the each row of first pixels in the current frame, the first noise reduction operation on the each row of first pixels (that are involved in the first noise reduction operation) in the current frame, and generate the denoised frame. More descriptions of the determination of the denoised frame may be found elsewhere in the present disclosure (e.g., FIGS. 5, 7, and descriptions thereof).

The intraframe difference determination module 440 may be configured to determine an intraframe difference for a pixel in a frame. In some embodiments, the intraframe difference determination module 440 may determine an intraframe difference for each second pixel of a plurality of second pixels in a denoised frame. For example, the intraframe difference determination module 440 may generate a filtered denoised frame by filtering a denoised frame using a third filter. The intraframe difference determination module 440 may determine an intraframe difference for each second pixel in the denoised frame, e.g., by subtracting a pixel value of a corresponding pixel in the filtered denoised frame from a pixel value of the each second pixel in the denoised frame. More descriptions of the determination of the intraframe difference for the each second pixel of the plurality of second pixels in the denoised frame may be found elsewhere in the present disclosure (e.g., FIGS. 5, 8, and descriptions thereof). In some embodiments, the intraframe difference determination module 440 may determine an intraframe difference for each pixel of a plurality of pixels in an initial frame. More descriptions of the determination of the intraframe difference for the each pixel of the plurality of pixels in the initial frame may be found elsewhere in the present disclosure (e.g., FIG. 10, and descriptions thereof).

The second processing module 450 may be configured to generate a target frame. In some embodiments, the second processing module 450 may generate a target frame by performing, based on an intraframe difference for each second pixel in a denoised frame, a second noise reduction operation on the denoised frame. For example, for each second pixel in each row of second pixels, the second processing module 450 may perform a third determination of whether the each second pixel in the each row is involved (or to be involved) in the determination of a second noise value, and generate a third determination result. For the each row of second pixels, the second processing module 450 may determine, based on the third determination results for the each row, at least one of a count of second pixels involved (or to be involved) in the determination of the second noise value in the each row, and a third sum value of at least one intraframe difference for at least one second pixel involved (or to be involved) in the determination of the second noise value in the each row. For the each row of second pixels, the second processing module 450 may perform, based on a second sum value for a row of first pixels corresponding to the each row, a fourth determination of whether the each row is involved in the second noise reduction operation and generate a fourth determination result. The second processing module 450 may determine the second noise value for the each row based on the fourth determination result for the each row, the count of second pixels involved (or to be involved) in the determination of the second noise value in the each row, and/or the third sum value for the each row. The second processing module 450 may perform, based on the second noise value for the each row of second pixels in the denoised frame, the second noise reduction operation on the each row of second pixels (that are involved in the second noise reduction operation) in the denoised frame, and generate the target frame. More descriptions of the determination of the target frame may be found elsewhere in the present disclosure (e.g., FIGS. 5, 9, and descriptions thereof).

The correction module 460 may be configured to correct a target frame. In some embodiments, the correction module 460 may perform a brightness correction operation on a target frame based on a first noise value for each row of first pixels in a current frame. More descriptions of the correction of the target frame may be found elsewhere in the present disclosure (e.g., FIG. 9 and descriptions thereof).

The modules in the processing device 112 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. In some embodiments, one or more modules may be combined into a single module. For example, the interframe difference determination module 420 and the intraframe difference determination module 440 may be combined as a single module which may both determine an interframe difference between each first pixel in a current frame and a corresponding pixel in a previous frame, and determine an intraframe difference for each second pixel of a plurality of second pixels in a denoised frame. As another example, the first processing module 430 and the second processing module 450 may be combined as a single module which may both perform a first noise reduction operation (e.g., an interframe noise reduction operation) on a current frame, and perform a second noise reduction operation (e.g., an intraframe noise reduction operation) on a denoised frame. In some embodiments, one or more modules may be added. For example, the processing device 112 may further include a storage module (not shown) used to store information and/or data (e.g., a current frame, a previous frame, a denoised frame, an interframe difference, an intraframe difference, etc.) associated with the image processing system 100.

Figure 5:
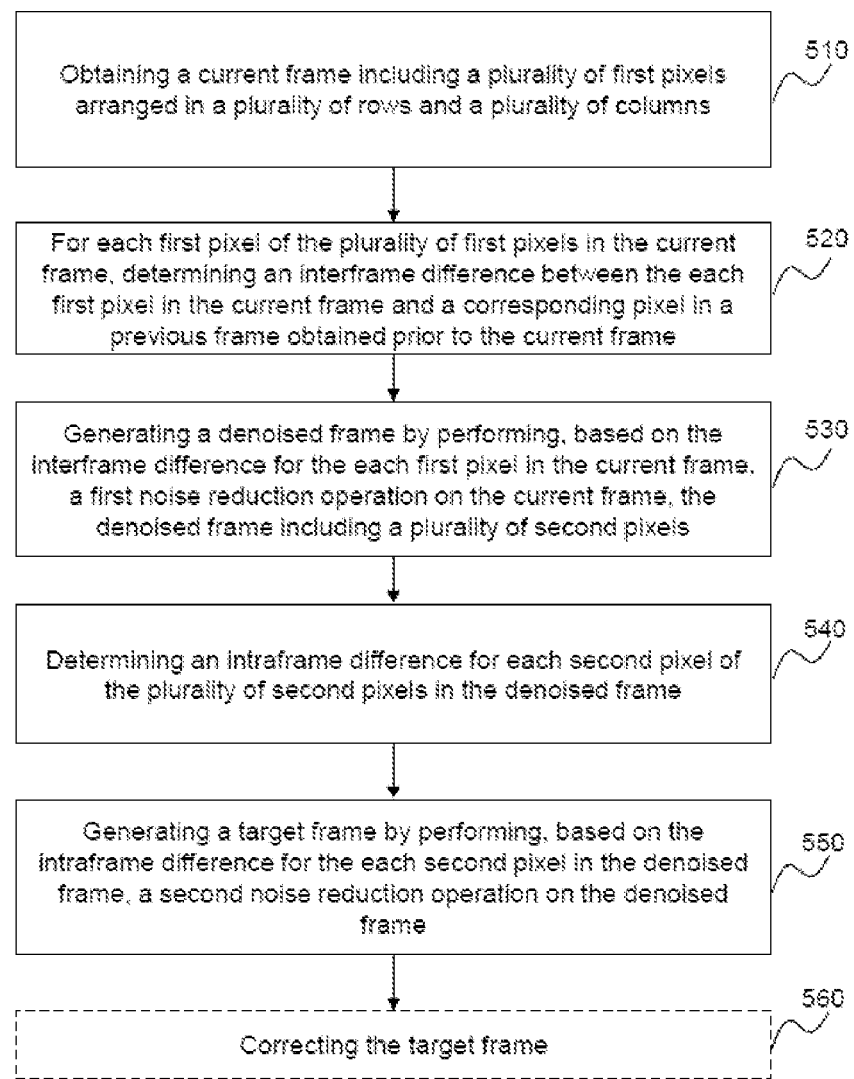
FIG. 5 is a flowchart illustrating an exemplary process for noise reduction according to some embodiments of the present disclosure.

FIG. 5 is a flowchart illustrating an exemplary process for noise reduction according to some embodiments of the present disclosure. The process 500 may be executed by the image processing system 100. For example, the process 500 may be implemented as a set of instructions stored in the storage 390. The processor 220 and/or the module(s) in FIG. 4 may execute the set of instructions, and when executing the instructions, the processor 220 and/or the module(s) may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process 500 as illustrated in FIG. 5 and described below is not intended to be limiting.

In 510, the processing device 112 (e.g., the obtaining module 410) may obtain a current frame. The current frame may include a plurality of first pixels arranged in a plurality of rows and a plurality of columns.

As used herein, a frame may refer to an image or a discrete unit within a video. In some embodiments, the processing device 112 may obtain a frame set from an image capture device (e.g., the image capture device 120) periodically (e.g., per second, per 2 seconds, per 5 seconds, per 10 seconds) or in real time. In some embodiments, during the capturing of frames, the image capture device 120 may transmit a plurality of frames to a storage device (e.g., the storage device 140) periodically (e.g., per second, per 2 seconds, per 5 seconds, per 10 seconds) or in real time (e.g., via the network 150). Further, the processing device 112 may access the storage device 140 and retrieve one or more frame in the frame set.

The frame set may include one or more frames. The one or more frames may include an initial frame, a current frame, and/or one or more previous frames corresponding to the current frame. As used herein, an initial frame may refer to a first frame obtained in the frame set. That is, no other frames are obtained prior to the initial frame. A current frame may refer to a frame that needs to be processed (e.g., denoised) by the image processing system 100. A previous frame may refer to a frame obtained prior to the current frame. In some embodiments, the previous frame may be an original frame captured by the image capture device 120. That is, the previous frame may not be processed (e.g., denoised) by the image processing system 100. Alternatively, in some embodiments, the previous frame may be processed (e.g., according to the process 500) before the processing of the current frame. In some embodiments, the initial frame may be designated as the current frame or the previous frame. If the initial frame is designated as the current frame, there may be no previous frame prior to the current frame.

The current frame may include the plurality of first pixels. The plurality of first pixels may be arranged in the plurality of rows and the plurality of columns. A number (or count) of the rows in the current frame may be the same as or different from a number (or count) of the columns in the current frame.

In some embodiments, the current frame may include row noises and/or column noises (e.g., dynamic stripe noises). The presence of the row noises and/or column noises may be caused by a structure and/or characteristic(s) (e.g., nonlinearities of a read out integrated circuit) of the image capture device 120 (e.g., an infrared imaging device) that acquires the current frame. The row noises (or column noises) may typically appear as horizontal (or vertical) stripes in the current frame. In some embodiments, the horizontal (or vertical) stripes may be consistent in a same row (or column) of the current frame. In some embodiments, the row noises and/or column noises may be temporal noises. For example, the horizontal or vertical stripes may change from frame to frame.

In 520, for each first pixel of the plurality of first pixels in the current frame, the processing device 112 (e.g., the interframe difference determination module 420) may determine an interframe difference between the each first pixel in the current frame and a corresponding pixel in a previous frame obtained prior to the current frame.

In some embodiments, the frame set may include one or more previous frames obtained prior to the current frame. In some embodiments, the processing device 112 may determine the interframe difference based on a previous frame obtained immediately prior to the current frame, and the current frame. In some embodiments, the processing device 112 may determine the interframe difference based on a previous frame that is spaced one or more other frames from the current frame, and the current frame. For example, if a number (or count) of frames in a frame set is 20, and frame 10 is a current frame, the processing device 112 may determine frame 09 as the previous frame corresponding to the current frame in the determination of the interframe difference. As another example, the processing device 1120 may determine frame 02 as the previous frame corresponding to the current frame in the determination of the interframe difference.

In some embodiments, an interframe difference between a first pixel in the current frame and a corresponding pixel in a previous frame (also referred to as an interframe difference for a first pixel in the current frame) may reflect a probability of the first pixel being located in a stationary area in the current frame (or a probability of the first pixel being located in a motion area in the current frame). A relatively small absolute value of an interframe difference for a first pixel in the current frame may indicate a relatively high probability of the first pixel being located in a stationary area in the current frame. Accordingly, a relatively large absolute value of an interframe difference for a first pixel in the current frame may indicate a relatively low probability of the first pixel being located in a stationary area in the current frame. Similarly, a relatively small absolute value of an interframe difference for a first pixel in the current frame may indicate a relatively low probability of the first pixel being located in a motion area in the current frame. Accordingly, a relatively large absolute value of an interframe difference for a first pixel in the current frame may indicate a relatively high probability of the first pixel being located in a motion area in the current frame.

In some embodiments, the processing device 112 may determine the interframe difference for the each first pixel in the current frame by subtracting a pixel value of the each first pixel in the current frame from a pixel value of a corresponding pixel in the previous frame. In some embodiments, the processing device 112 may determine the interframe difference for the each first pixel in the current frame by subtracting a pixel value of a corresponding pixel in the previous frame from or a pixel value of the each first pixel in the current frame. In some embodiments, the processing device 112 may determine the interframe difference for the each first pixel in the current frame based on a filtered current frame and/or a filtered previous frame. For example, the processing device 112 may generate a filtered current frame by filtering the current frame using a first filter (e.g., a first edge-preserving filter). The processing device 112 may generate a filtered previous frame by filtering the previous frame using a second filter (e.g., a second edge-preserving filter). In some embodiments, the processing device 112 may determine the interframe difference for the each first pixel in the current frame by subtracting a pixel value of a corresponding pixel in the filtered current frame from a pixel value of a corresponding pixel in the filtered previous frame. In some embodiments, the processing device 112 may determine the interframe difference for the each first pixel in the current frame by subtracting a pixel value of a corresponding pixel in the filtered previous frame from a pixel value of a corresponding pixel in the filtered current frame. More descriptions of the determination of the interframe difference for the each first pixel in the current frame may be found elsewhere in the present disclosure (e.g., FIG. 6 and descriptions thereof).

In 530, the processing device 112 (e.g., the first processing module 430) may generate a denoised frame by performing, based on the interframe difference for the each first pixel in the current frame, a first noise reduction operation on the current frame. The denoised frame may include a plurality of second pixels.

In some embodiments, the first noise reduction operation may include an interframe noise reduction operation (e.g., a noise reduction operation performed based on interframe difference(s)). In some embodiments, the first noise reduction operation may include a process of filtering noises using one or more temporal filters for pixels at a same location from different frames. In some embodiments, the interframe noise reduction operation may be used to reduce noises in an area of a frame where there is no motion (also referred to as a stationary area). For example, the interframe noise reduction operation may be used to reduce dynamic stripe noises (e.g., interframe dynamic stripe noises) of first pixel(s) located in a stationary area (or a substantially stationary area) in the current frame.

Taking a process for reducing horizontal stripe noises in the current frame as an example. In some embodiments, the processing device 112 may determine a first noise value for each row of first pixels in the current frame based on the interframe difference for the each first pixel in the current frame. In some embodiments, the first noise value may be referred to as an interframe noise value. The first noise value for a row of first pixels in the current frame may reflect a noise amplitude (e.g., an interframe noise amplitude) of horizontal stripe noises of the row of first pixels in the current frame.

In some embodiments, for each first pixel in the each row of first pixels, the processing device 112 may perform a first determination of whether the each first pixel in the each row is involved (or to be involved) in the determination of the first noise value and may generate a first determination result. For example, the processing device 112 may determine whether a first pixel in a row is involved (or to be involved) in the determination of the first noise value by determining whether the first pixel in the row is located in a stationary area (or a substantially stationary area) in the current frame. Specifically, in some embodiments, the processing device 112 may determine whether a first pixel in a row is located in the stationary area (or the substantially stationary area) in the current frame based on the interframe difference for the first pixel in the row and a first threshold. For example, the processing device 112 may determine whether an absolute value of an interframe difference for the first pixel in the row satisfies the first threshold (e.g., whether an absolute value of an interframe difference for the first pixel in the row is less than the first threshold). In response to a determination that the absolute value of the interframe difference for the first pixel in the row of first pixels satisfies the first threshold, the processing device 112 may determine that the first pixel is located in a stationary area (or a substantially stationary area) in the current frame, and the first pixel in the row is involved (or to be involved) in the determination of the first noise value.

For the each row of first pixels, the processing device 112 may perform a second determination of whether the each row is involved (or to be involved) in the first noise reduction operation and may generate a second determination result. For example, the processing device 112 may determine whether a row is involved (or to be involved) in the first noise reduction operation by determining whether the row is located in a stationary area (or a substantially stationary area) in the current frame. Specifically, in some embodiments, the processing device 112 may determine whether a row is located in a stationary area (or a substantially stationary area) in the current frame based on a sum value of multiple interframe differences for multiple first pixels in the row and a second threshold. For example, the processing device 112 may determine whether an absolute value of a sum value for the row satisfies the second threshold (e.g., whether an absolute value of a sum value for the row is less than the second threshold). In response to a determination that the absolute value of the sum value for the row of first pixels satisfies the second threshold, the processing device 112 may determine that the row is located in a stationary area (or a substantially stationary area) in the current frame, and the row is involved (or to be involved) in the first noise reduction operation.

The processing device 112 may determine the first noise value for the each row based on the first determination results for the each row, and/or the second determination result for the each row. The processing device 112 may perform the first noise reduction operation on the row(s) of first pixels (that are involved in the first noise reduction operation) in the current frame based on the first noise value for the each row of first pixels in the current frame, and generate a denoised frame. More descriptions of the generation of the denoised frame may be found elsewhere in the present disclosure (e.g., FIG. 7 and descriptions thereof).

In 540, the processing device 112 (e.g., the intraframe difference determination module 440) may determine an intraframe difference for each second pixel of the plurality of second pixels in the denoised frame.

In some embodiments, intraframe difference(s) for second pixel(s) in the denoised frame may reflect residual noise information of a motion area and/or scene edge information (e.g., blurry scene edge) in the denoised frame.

In some embodiments, the processing device 112 may determine the intraframe difference for the each second pixel of the plurality of second pixels in the denoised frame based on the denoised frame and a filtered denoised frame. For example, the processing device 112 may generate the filtered denoised frame by filtering the denoised frame using a third filter (e.g., a third edge-preserving filter). After the filtering operation is performed on the denoised frame, the denoised frame may include residual noise information of a motion area and/or blurred scene edge information. In some embodiments, the processing device 112 may determine the intraframe difference for the each second pixel in the denoised frame by subtracting a pixel value of a corresponding pixel in the filtered denoised frame from a pixel value of the each second pixel in the denoised frame. In some embodiments, the processing device 112 may determine the intraframe difference for the each second pixel in the denoised frame by subtracting a pixel value of the each second pixel in the denoised frame from a pixel value of a corresponding pixel in the filtered denoised frame. More descriptions of the determination of the intraframe difference for the each second pixel in the denoised frame may be found elsewhere in the present disclosure (e.g., FIG. 8 and descriptions thereof).

In 550, the processing device 112 (e.g., the second processing module 450) may generate a target frame by performing, based on the intraframe difference for the each second pixel in the denoised frame, a second noise reduction operation on the denoised frame.

In some embodiments, the second noise reduction operation may include an intraframe noise reduction operation (e.g., a noise reduction operation performed based on intraframe difference(s)). In some embodiments, the second noise reduction operation may include a process of filtering noises using one or more spatial filters for pixels in one frame (e.g., the denoised frame). In some embodiments, the effect of the intraframe noise reduction operation may be affected (e.g., reduced) by scene edge information associated with the denoised frame.

Taking a process for reducing horizontal stripe noises in the current frame as an example. In some embodiments, the processing device 112 may determine a second noise value for each row of second pixels in the denoised frame based on the intraframe difference for the each second pixel in the denoised frame. The second noise value for a row of second pixels in the denoised frame may reflect a residual noise amplitude of horizontal stripe noises of the row of second pixels. After the first noise reduction operation is performed on the current frame, the residual noise may be in the motion area in the denoised frame.

In some embodiments, for each second pixel in the each row of second pixels, the processing device 112 may perform a third determination of whether the each second pixel in the each row is involved (or to be involved) in the determination of the second noise value and may generate a third determination result. For example, the processing device 112 may determine whether a second pixel in a row is involved (or to be involved) in the determination of the second noise value by determining whether the second pixel in the row is affected (e.g., blurred) by residual noises (e.g., dynamic stripe noises). Specifically, in some embodiments, the processing device 112 may determine whether the second pixel in the row is affected (e.g., blurred) by residual noises (e.g., dynamic stripe noises) based on the intraframe difference for the second pixel in the row and a third threshold. For example, the processing device 112 may determine whether an absolute value of an intraframe difference for a second pixel in a row satisfies the third threshold (e.g., whether an absolute value of an intraframe difference for a second pixel in a row is less than the third threshold). In response to a determination that the absolute value of the intraframe difference for the second pixel in the row of second pixels satisfies the third threshold, the processing device 112 may determine that the second pixel is affected (e.g., blurred) by residual noises (e.g., dynamic stripe noises), and the second pixel is involved (or to be involved) in the determination of the second noise value for the row. In response to a determination that the absolute value of the intraframe difference for the second pixel in the row of second pixels does not satisfies the third threshold, the processing device 112 may determine that the second pixel is affected (e.g., blurred) by scene edge and/or detail information, and the second pixel is not involved (or not to be involved) in the determination of the second noise value for the row.

For the each row of second pixels, the processing device 112 may perform a fourth determination of whether the each row is involved (or to be involved) in the second noise reduction operation and may generate a fourth determination result. For example, the processing device 112 may determine whether the a row is involved (or to be involved) in the second noise reduction operation by determining whether the row is located in a motion area in the current frame. Specifically, in some embodiments, the processing device 112 may determine whether a row of second pixels is located in a motion area in the denoised frame based on a sum value of multiple interframe differences for multiple first pixels in a row in the current frame corresponding to the row of second pixels in the denoised frame, and a third threshold. For example, the processing device 112 may determine whether an absolute value of a sum value for the row satisfies the third threshold (e.g., whether an absolute value of a sum value corresponding to the row is greater than the third threshold). In response to a determination that the absolute value of the sum value corresponding to the row of second pixels satisfies the third threshold, the processing device 112 may determine that the row is located in a motion area in the denoised frame, and the row is involved (or to be involved) in the second noise reduction operation.

The processing device 112 may determine the second noise value for the each row based on the third determination results for the each row, and/or the fourth determination result for the each row. The processing device 112 may perform the second noise reduction operation on the row(s) of second pixels (that are involved in the second noise reduction operation) in the denoised frame based on the second noise value for the each row of second pixels in the denoised frame, and generate a target frame. More descriptions of the generation of the target frame may be found elsewhere in the present disclosure (e.g., FIG. 9 and descriptions thereof).

In 560, the processing device 112 (e.g., the correction module 460) may correct the target frame.

In some embodiments, interframe information (e.g., brightness change information) associated with the current frame may be suppressed by the first noise reduction operation. The target frame may be corrected to restore the interframe information based on the interframe information associated with the current frame. In some embodiments, the processing device 112 may perform a brightness correction operation on the target frame. In some embodiments, the processing device 112 may perform a contrast correction operation on the target frame. In some embodiments, the processing device 112 may perform a sharpness correction operation on the target frame. More descriptions of the correction of the target frame may be found elsewhere in the present disclosure (e.g., FIG. 9 and descriptions thereof).

The systems and methods for noise reduction described in the present disclosure combine an interframe noise reduction operation and an intraframe noise reduction operation. Interframe noise reduction operation may be performed to reduce dynamic stripe noises of pixels that are located in the stationary area(s) (or substantially stationary area(s)) of a frame (e.g., the current frame). Intraframe noise reduction operation may be performed to reduce residual noise information included in the motion area and/or scene edge information of the frame. According to some embodiments of the present disclosure, noises (e.g., dynamic stripe noises) in a frame caused by the structure and/or characteristic(s) of the image capture device 120 (e.g., an infrared imaging device) that acquires the frame may be reduced effectively and/or targetedly, and flickering vertical and/or horizontal stripes may not be substantially observed in the frame.

In some embodiments, different types of infrared imaging devices may cause different types of dynamic stripe noises (e.g., row noises, column noises) in a captured frame. In some embodiments, the presence of the row noises may be relatively common relative to the column noises. The systems and methods for noise reduction described in the present disclosure may reduce row noises and/or column noises in frame(s) efficiently, and may also be applicable for noise reduction in a frame in which row noises changes to column noises (or column noises changes to row noises) due to abnormal installation for a plurality of infrared sensors of the infrared imaging device that captures the frame. The systems and methods for noise reduction described in the present disclosure may also be applicable for noise reduction in a frame in which both row noises and column noises are present.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted in process 500. For example, operation 560 may be omitted in process 500.

Figure 6:
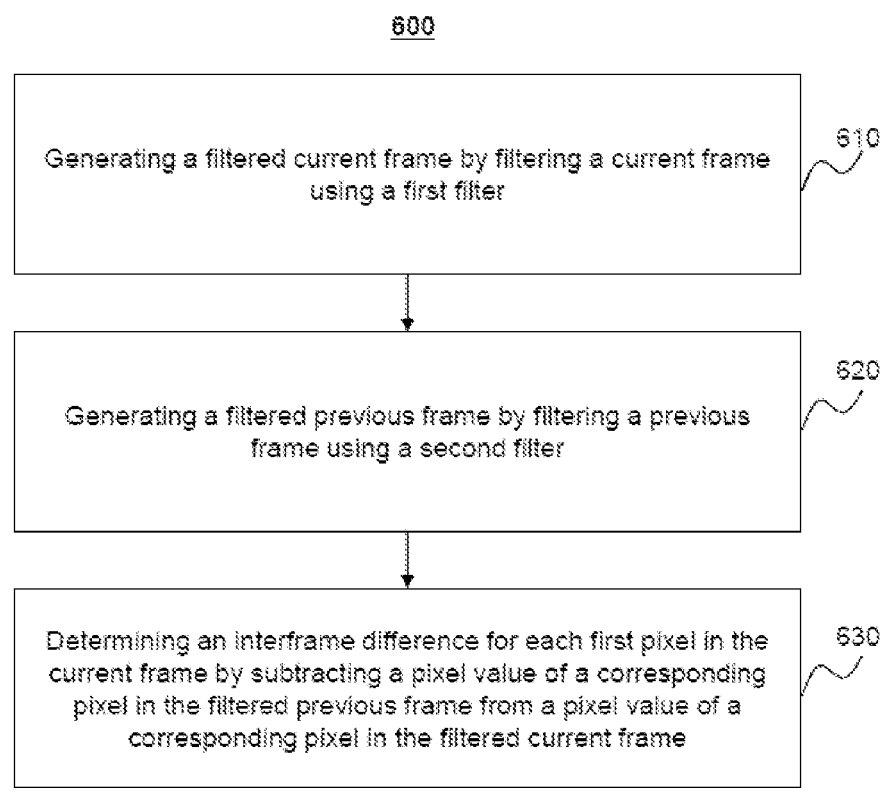
FIG. 6 is a flowchart illustrating an exemplary process for determining an interframe difference for each first pixel in a current frame according to some embodiments of the present disclosure.

FIG. 6 is a flowchart illustrating an exemplary process for determining an interframe difference for each first pixel in a current frame according to some embodiments of the present disclosure. The process 600 may be executed by the image processing system 100. For example, the process 600 may be implemented as a set of instructions stored in the storage 390. The processor 220 and/or the module(s) in FIG. 4 may execute the set of instructions, and when executing the instructions, the processor 220 and/or the module(s) may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process 600 as illustrated in FIG. 6 and described below is not intended to be limiting. In some embodiments, operation 520 illustrated in FIG. 5 may be performed according to the process 600.

In 610, the processing device 112 (e.g., the interframe difference determination module 420) may generate a filtered current frame by filtering a current frame using a first filter.

In some embodiments, the first filter may be used to weaken noises (e.g., dynamic stripe noises) of each first pixel in each row of first pixels in the current frame. In some embodiments, the first filter may be a linear filter, a nonlinear filter, or the like. In some embodiments, the first filter may be a mean filter, a median filter, an adaptive filter, a wiener filter, a max and min filter, a midpoint filter, an alpha-trimmed mean filter, or the like.

In some embodiments, the first filter may include a first edge-preserving filter. As used herein, an edge-preserving filtering may refer to an image filtering process configured to smooth away noises while retaining edges (e.g., sharp edges) of object(s) in the image. In some embodiments, the first edge-preserving filter may include a mean filter (e.g., a threshold based mean filter), a median filter (e.g., a threshold based median filter), a bilateral filter, a guided filter, an anisotropic diffusion filter, a weighted least square filter, or the like.

The first filter may have a first filter window. As used herein, a filter window may refer to a selection pattern for picking up neighboring elements (e.g., neighboring pixels) around an element (e.g., a pixel) to be processed in an image. For example, a filter may perform a same or similar action for each element in an image (e.g., each first pixel in the current frame) based on multiple neighboring elements (e.g., multiple neighboring first pixels) of the each element in the filter window. In some embodiments, the first filter window may slide over the current frame, and each first pixel in the current frame may be processed. In some embodiments, a size of the first filter window (also referred to as a first window size of the first filter) may be 1 (row)×n (column), and n may be an integer greater than 1 and no greater than a number or count of the columns of first pixels in the current frame. For example, the first filter window with a size of 1×n may cover one row of first pixels and n columns of first pixels in the current frame.

In some embodiments, the processing device 112 may filter the current frame using a mean filter. In some embodiments, the mean filter may be used to run through a current frame pixel by pixel, and a value (e.g., a gray value, a brightness value) of a first pixel may be replaced (or updated) with an average value (e.g., a mean value) of a plurality of neighboring pixels of the first pixel. As used herein, the mean value of a plurality of neighboring pixels may refer to a sum of values of the plurality of neighboring pixels divided by a total number (or count) of the plurality of neighboring pixels. For example, the first filter window of the mean filter may slide over the current frame, and a value of a first pixel at a center of the first filter window may be replaced by an average value of a plurality of neighboring pixels of the first pixel in the first filter window.

In some embodiments, the processing device 112 may filter the current frame using a threshold based mean filter. In some embodiments, the processing device 112 may select one or more target pixels from a plurality of neighboring pixels in the first filter window. For example, the processing device 112 may determine whether a difference between a value of a neighboring pixel in the first filter window and a value of a first pixel at the center of the first filter window satisfies a threshold (e.g., less than the threshold). In response to a determination that the difference between the value of the neighboring pixel in the first filter window and the value of the first pixel at the center of the first filter window satisfies the preset condition (e.g., less than threshold), the processing device 112 may determine the neighboring pixel as a target pixel. The processing device 112 may replace the value of the first pixel at the center of the first filter window with an average value (e.g., a mean value) of the target pixels in the first filter window.

In 620, the processing device 112 (e.g., the interframe difference determination module 420) may generate a filtered previous frame by filtering a previous frame using a second filter.

In some embodiments, the second filter may be used to blur noises (e.g., dynamic stripe noises) in the previous frame. In some embodiments, the second filter may be a linear filter, a nonlinear filter, or the like. In some embodiments, the first filter may be a mean filter, a median filter, an adaptive filter, a wiener filter, a max and min filter, a midpoint filter, an alpha-trimmed mean filter, or the like.

In some embodiments, the second filter may include a second edge-preserving filter. In some embodiments, the second edge-preserving filter may include a mean filter (e.g., a threshold based mean filter), a median filter (e.g., a threshold based median filter), a bilateral filter, a guided filter, an anisotropic diffusion filter, a weighted least square filter, or the like. The type of the second filter may be the same as or different from the type of the first filter. In some embodiments, if the type of the second filter is the same as the type of the first filter, the parameter(s) (e.g., a window size) of the second filter may be the same as or different from the parameters(s) of the first filter. The second filter may have a second filter window. In some embodiments, a size of the second filter window (also referred to as a second window size of the second filter) may be m (row)×n (column), in which m may be an integer greater than 1 and no greater than a number or count of the rows of pixels in the previous frame, and n may be an integer greater than 1 and no greater than a number or count of the columns of pixels in the previous frame. For example, the second filter window with a size of m×n may cover m rows of pixels and n columns of pixels in the previous frame. In some embodiments, m may be the same as or different from n. The filtering process of the previous frame may be similar to the filtering process of the current frame as described in connection with operation 610.

Accordingly, noises (e.g., dynamic stripe noises) of each first pixel in each row in the current frame may be weakened by filtering the current frame using the first filter with the 1×n window size. Noises (e.g., dynamic stripe noises) in the previous frame may be blurred by filtering the previous frame using the second filter with the m×n window size. In some embodiments, noises in stationary area(s) (or substantially stationary area(s)) of the current frame may further be reduced or corrected based on the filtered current frame and the filtered previous frame.

In 630, the processing device 112 (e.g., the interframe difference determination module 420) may determine an interframe difference for each first pixel in the current frame by subtracting a pixel value of a corresponding pixel in the filtered previous frame from a pixel value of a corresponding pixel in the filtered current frame.

In some embodiments, the processing device 112 may determine the interframe difference for the each first pixel in the current frame by performing a subtraction operation on the pixel value of the corresponding pixel in the filtered current frame and the pixel value of the corresponding pixel in the filtered previous frame. For example, the processing device 112 may determine the interframe difference for the each first pixel in the current frame according to Equation (1):

$$\text{Diff3D}_{i,j} = \text{Cur}'_{i,j} - \text{Pre}'_{i,j}, \quad (1)$$

where $\text{Diff3D}_{i,j}$ refers to an interframe difference for a first pixel in the current frame; $\text{Cur}'_{i,j}$ refers to a pixel value of a corresponding pixel in the filtered current frame; $\text{Pre}'_{i,j}$ refers to a pixel value of a corresponding pixel in the filtered previous frame; i refers to an ith row; and j refers to a jth column.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the operations 610 and/or 620 may be omitted, and the interframe difference for the each first pixel in the current frame may be determined based on the current frame and the previous frame.

Figure 7:
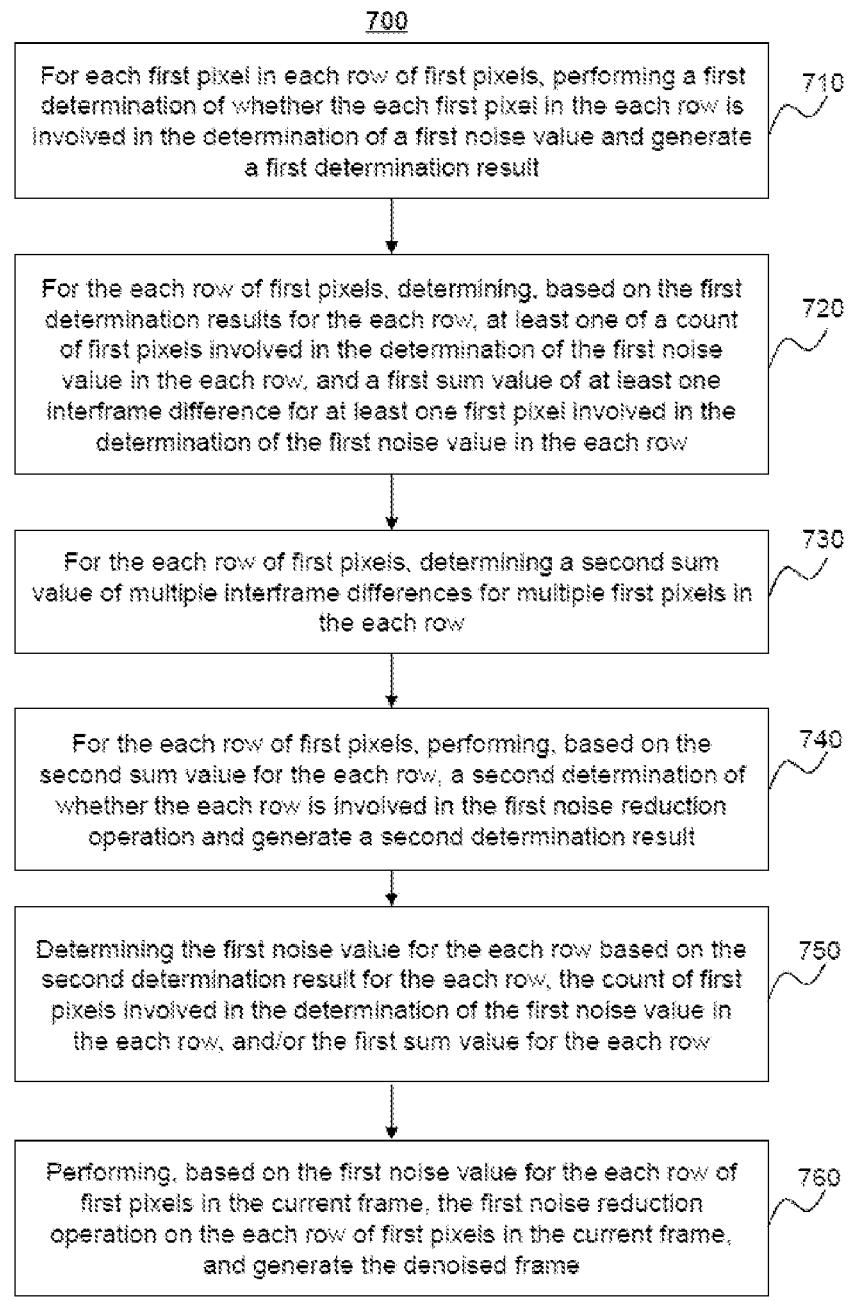
FIG. 7 is a flowchart illustrating an exemplary process for generating a denoised frame according to some embodiments of the present disclosure.

FIG. 7 is a flowchart illustrating an exemplary process for generating a denoised frame according to some embodiments of the present disclosure. The process 700 may be executed by the image processing system 100. For example, the process 700 may be implemented as a set of instructions stored in the storage 390. The processor 220 and/or the module(s) in FIG. 4 may execute the set of instructions, and when executing the instructions, the processor 220 and/or the module(s) may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process 700 as illustrated in FIG. 7 and described below is not intended to be limiting. In some embodiments, operation 530 illustrated in FIG. 5 may be performed according to the process 700.

In 710, for each first pixel in each row of first pixels, the processing device 112 (e.g., the first processing module 430) may perform a first determination of whether the each first pixel in the each row is involved (or to be involved) in the determination of a first noise value and generate a first determination result. A first pixel in a row is involved (or to be involved) in the determination of a first noise value for the row may refer that a pixel value of the first pixel may be counted in the determination of the first noise value for the row, i.e., the first noise value for the row is related to the first pixel. A first pixel in a row is not involved (or not to be involved) in the determination of a first noise value for the row may refer that a pixel value of the first pixel may not be counted in the determination of the first noise value for the row, i.e., the first noise value for the row is not related to the first pixel. In some embodiments, a first determination result may be generated for each first pixel in a row, and accordingly, a plurality of first determination results may be generated for the row.

In some embodiments, the processing device 112 may determine whether a first pixel in a row is involved (or to be involved) in the determination of the first noise value by determining whether the first pixel in the row is located in a stationary area (or a substantially stationary area) in the current frame. In some embodiments, the processing device 112 may determine whether a first pixel in a row is located in the stationary area (or the substantially stationary area) in the current frame based on an interframe difference for the first pixel in the row and a first threshold.

In some embodiments, the processing device 112 may determine whether an absolute value of an interframe difference for a first pixel in a row satisfies the first threshold. For example, the processing device 112 may determine whether the absolute value of the interframe difference for the first pixel in the row is less than the first threshold. In response to a determination that the absolute value of the interframe difference for the first pixel in the row of first pixels satisfies the first threshold (e.g., the absolute value of the interframe difference for the first pixel in the row of first pixels is less than the first threshold), the processing device 112 may determine that the first pixel is located in a stationary area (or a substantially stationary area) in the current frame, and the first pixel is involved (or to be involved) in the determination of the first noise value for the row. In response to a determination that the absolute value of the interframe difference for the first pixel in the row of first pixels does not satisfy the first threshold (e.g., the absolute value of the interframe difference for the first pixel in the row of first pixels is greater than the first threshold), the processing device 112 may determine that the first pixel is not located in a stationary area (or a substantially stationary area) in the current frame, and the first pixel is not involved (or not to be involved) in the determination of the first noise value for the row.

It should be noted that if an absolute value of an interframe difference for a first pixel in a row of first pixels is equal to the first threshold, the processing device 112 may either determine that the first pixel is involved (or to be involved) in the determination of the first noise value for the row, or determine that the first pixel is not involved (or not to be involved) in the determination of the first noise value for the row.

In some embodiments, the first threshold may be used to distinguish scene information and noise information in the current frame. For example, the first threshold may be used to determine whether the each first pixel in the each row is located in a stationary area (or a substantially stationary area) in the current frame. In some embodiments, the first threshold may be a brightness threshold, a grayscale threshold, or the like. In some embodiments, the first threshold may be a default parameter stored in a storage device (e.g., the storage device 140). Additionally or alternatively, the first threshold may be set manually by a user of the image processing system 100, or determined by one or more components (e.g., the processing device 112) of the image processing system 100 according to situations. For example, the first threshold may be determined by a user of the image processing system 100 based on experience. As another example, the first threshold may be determined based on noise information (e.g., a noise amplitude) and/or scene information in the current frame. As still another example, the first threshold may be determined based on a bit width of the current frame. In some embodiments, for a current frame with a bit width of 14 bits captured by an infrared imaging device, the first threshold may be in a range from 0 to 32. For example, the first threshold may be in a range from 10 to 20. As another example, the first threshold may be 15.

In 720, for the each row of first pixels, the processing device 112 (e.g., the first processing module 430) may determine, based on the first determination results for the each row, at least one of a count of first pixels involved (or to be involved) in the determination of the first noise value in the each row, and a first sum value of at least one interframe difference for at least one first pixel involved (or to be involved) in the determination of the first noise value in the each row. In some embodiments, the first sum value for a row may refer to a sum of interframe differences for the first pixels involved (or to be involved) in the determination of the first noise value in the row.

For illustration purposes, for an ith row of first pixels in the current frame, the processing device 112 may perform the first determination of whether each first pixel in the ith row is involved (or to be involved) in the determination of the first noise value for the ith row. Assuming that, before the first determination is performed on a jth first pixel in the ith row, the processing device 112 determines that a count of first pixels involved (or to be involved) in the determination of the first noise value in the ith row is $Num3D_{i,j-1}$, and a first sum value of the interframe differences for the first pixels involved (or to be involved) in the determination of the first noise value in the ith row is $Sum3D_{i,j-1}$, then the processing device 112 may determine whether the jth pixel in the ith row is involved (or to be involved) in the determination of the first noise value according to the operation 710. If the jth first pixel in the ith row is involved (or to be involved) in the determination of the first noise value, the processing device 112 may determine that the count of first pixels involved (or to be involved) in the determination of the first noise value in the ith row is $Num3D_{i,j}=Num3D_{i,j-1}+1$, and the first sum value of the interframe differences for the first pixels involved (or to be involved) in the determination of the first noise value in the ith row is $Sum3D_{i,j}=Sum3D_{i,j-1}+Diff3D_{i,j}$, in which $Diff3D_{i,j}$ refers to an interframe difference for the jth first pixel in the ith row. If the jth first pixel in the ith row is not involved (or not to be involved) in the determination of the first noise value, the processing device 112 may determine that the count of first pixels involved (or to be involved) in the determination of the first noise value in the ith row is still $Num3D_{i,j-1}$, and the first sum value of the interframe differences for the first pixels involved (or to be involved) in the determination of the first noise value in the ith row is still $Sum3D_{i,j-1}$. Similarly, the processing device 112 may perform the first determination on one or more other first pixels (e.g., a (j+1) th first pixel, a (j+2) th first pixel, . . . ) in the ith row of the current frame. The processing device 112 may update the count of first pixels involved (or to be involved) in the determination of the first noise value in the ith row, and the first sum value of the interframe differences for the first pixels involved (or to be involved) in the determination of the first noise value in the ith row based on the one or more first determination results for the one or more other first pixels in the ith row.

In 730, for the each row of first pixels, the processing device 112 (e.g., the first processing module 430) may determine a second sum value of multiple interframe differences for multiple first pixels in the each row.

As used herein, the second sum value of multiple interframe differences for multiple first pixels in a row (also referred to as the second sum value for the row) may reflect a probability of the row being located in a motion area of the current frame. In some embodiments, the probability of the row being located in a motion area may be determined based on a ratio of a number (or count) of first pixels located in the motion area to all the first pixels in the row. A relatively large second sum value for a row may indicate a relatively high probability of the row being located in a motion area. In some embodiments, the second sum value for the row may be used to determine whether the row is involved (or to be involved) in a first noise reduction operation (e.g., an interframe noise reduction operation). Accordingly, the performance of an interframe noise reduction operation on a row that is not involved in the first noise reduction operation may be avoided, thereby facilitating a targeted noise reduction on the current frame.

In some embodiments, the processing device 112 may determine the second sum value for the each row by summing a plurality of interframe differences for all first pixels in the each row.

In 740, for the each row of first pixels, the processing device 112 (e.g., the first processing module 430) may perform, based on the second sum value for the each row, a second determination of whether the each row is involved (or to be involved) in the first noise reduction operation and generate a second determination result. A row is involved (or to be involved) in the first noise reduction operation may refer that first pixels in the row may be processed in the first noise reduction operation, i.e., the first noise reduction operation may be performed on the first pixels in the row. A row is not involved (or not to be involved) in the first noise reduction operation may refer that first pixels in the row may not be processed in the first noise reduction operation, i.e., the first noise reduction operation may not be performed on the first pixels in the row. In some embodiments, a second determination result may be generated for each row in the current frame (or filtered current frame), and accordingly, a plurality of second determination results may be generated for the current frame (or filtered current frame).

In some embodiments, the processing device 112 may determine whether a row is involved (or to be involved) in the first noise reduction operation by determining whether the row is located in a stationary area (or a substantially stationary area) in the current frame. In some embodiments, the processing device 112 may determine whether a row is located in the stationary area (or the substantially stationary area) in the current frame based on the second sum value for the row and a second threshold.

In some embodiments, the processing device 112 may determine whether an absolute value of the second sum value for the row satisfies the second threshold. For example, the processing device 112 may determine whether the absolute value of the second sum value for the row is less than a second threshold. In response to a determination that the absolute value of the second sum value for the row of first pixels satisfies the second threshold (e.g., the absolute value of the second sum value for the row of first pixels is less than the second threshold), the processing device 112 may determine that a probability of the row being located in a stationary area (or a substantially stationary area) is relatively high, and the row is involved (or to be involved) in the first noise reduction operation. In response to a determination that the absolute value of the second sum value for the row of first pixels does not satisfy the second threshold (e.g., the absolute value of the second sum value for the row of first pixels is greater than the second threshold), the processing device 112 may determine that the probability of the row being located in a stationary area (or a substantially stationary area) is relatively low, and the row is not involved (or not to be involved) in the first noise reduction operation.

It should be noted that if an absolute value of a second sum value for a row of first pixels is equal to the second threshold, the processing device 112 may either determine that the row is involved (or to be involved) in the first noise reduction operation, or determine that the row is not involved (or not to be involved) in the first noise reduction operation.

In some embodiments, the second threshold may be used to distinguish scene information and noise information in the current frame. For example, the second threshold may be used to determine whether the each row is located in a stationary area (or a substantially stationary area) in the current frame. In some embodiments, the second threshold may be a brightness threshold, a grayscale threshold, or the like. In some embodiments, the second threshold may be a default parameter stored in a storage device (e.g., the storage device 140). Additionally or alternatively, the second threshold may be set manually by a user of the image processing system 100, or determined by one or more components (e.g., the processing device 112) of the image processing system 100 according to situations. For example, the second threshold may be determined by a user of the image processing system 100 based on experience. As another example, the second threshold may be determined based on noise information (e.g., a noise amplitude) and/or scene information in the current frame. As another example, the second threshold may be determined based on a bit width of the current frame. In some embodiments, for a current frame with a bit width of 14 bits captured by an infrared imaging device, the second threshold may be in a range from 0 to 256. For example, the second threshold may be in a range from 50 to 150. As another example, the second threshold may be 100.

In 750, the processing device 112 (e.g., the first processing module 430) may determine the first noise value for the each row based on the second determination result for the each row, the count of first pixels involved (or to be involved) in the determination of the first noise value in the each row, and/or the first sum value for the each row.

In some embodiments, in response to a determination that a row is involved (or to be involved) in the first noise reduction operation, the processing device 112 may determine an average value of the interframe differences for the first pixels involved (or to be involved) in the determination of the first noise value in the row as the first noise value for the row. For example, the processing device 112 may designate a ratio of the first sum value for the row to the count of first pixels involved (or to be involved) in the determination of the first noise value in the row as the first noise value for the row. In response to a determination that a row is not involved (or not to be involved) in the first noise reduction operation, the processing device 112 may designate 0 as the first noise value for the row.

For illustration purposes, assuming that the processing device 112 determines that a count of first pixels involved (or to be involved) in the determination of the first noise value in the ith row is Num3D$_i$, a first sum value of the interframe differences for the first pixels involved (or to be involved) in the determination of the first noise value in the ith row is Sum3D$_i$, and a second sum value of the interframe differences for all the first pixels in the ith row is SumRowDiff3D$_i$, then the processing device 112 may compare an absolute value of the second sum value (e.g., |SumRowDiff3D$_i$|) for the ith row and a second threshold (e.g., thRowDiff1). If the absolute value of the second sum value for the ith row is less than the second threshold (i.e., |SumRowDiff3D$_i$|<thRowDiff1), that is, the ith row is involved (or to be involved) in the first noise reduction operation, then the processing device 112 may determine the first noise value for the ith row according to Equation (2):

$$Noise3D_i = \frac{Sum3D_i}{Num3D_i}, \qquad (2)$$

where Noise3D$_i$ refers to the first noise value for the ith row in the current frame; Sum3D$_i$ refers to the first sum value of interframe differences for the first pixels involved (or to be involved) in the determination of the first noise value in the ith row in the current frame; and Num3D$_i$ refers to the count of first pixels involved (or to be involved) in the determination of the first noise value in the ith row in the current frame. If the absolute value of the second sum value for the ith row exceeds the second threshold (i.e., |SumRowDiff3D$_i$|>thRowDiff1), that is, the ith row is not involved (or not to be involved) in the first noise reduction operation, the processing device 112 may designate 0 as the first noise value for the ith row. That is, the processing device 112 may not perform the first noise reduction operation on the ith row of first pixels in the current frame. If the absolute value of the second sum value for the ith row is equal to the second threshold (i.e., |SumRowDiff3D$_i$|=thRowDiff1), the processing device 112 may either determine that the ith row is involved (or to be involved) in the first noise reduction operation, or determine that the ith row is not involved (or not to be involved) in the first noise reduction operation.

In 760, the processing device 112 (e.g., the first processing module 430) may perform, based on the first noise value for the each row of first pixels in the current frame, the first noise reduction operation on the each row of first pixels (that are involved in the first noise reduction operation) in the current frame, and generate the denoised frame.

In some embodiments, the processing device 112 may perform the first noise reduction operation on a row of first pixels in the current frame according to Equation (3):

$$Out3D_{i,j} = Cur_{i,j} - Noise3D_i, \qquad (3)$$

where Out3D$_{i,j}$ refers to a value of a corresponding second pixel in a denoised frame; Cur$_{i,j}$ refers to a value of a first pixel in the current frame; and Noise3D$_i$ refers to a first noise value for the ith row in the current frame; i refers to an ith row; and j refers to a jth column. The processing device 112 may determine the denoised frame based on a plurality of values of second pixels in the denoised frame.

Accordingly, the interframe noise reduction operation may be performed on the each row of first pixels in the current frame based on the first noise value for the each row of first pixels in the current frame. Interframe dynamic stripe noises in the current frame may be reduced targetedly. Compared with a single-pixel based time domain noise reduction operation, the effect of the interframe noise reduction operation may be improved.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, operations 730 and 740 may be performed before operation 710. For example, for the each row of first pixels, the processing device 112 may determine a second sum value of multiple interframe differences for multiple first pixels in the each row. The processing device 112 may determine whether the each row is involved (or to be involved) in the first noise reduction operation based on the second sum value for the each row. In response to a determination that an absolute value of a second sum value for a row of first pixels does not satisfy the second threshold, the processing device 112 may determine that the row is not involved (or not to be involved) in the first noise reduction operation. The processing device 112 may designate 0 as the first noise value for the row that is not involved (or not to be involved) in the first noise reduction operation.

In response to a determination that an absolute value of a second sum value for a row of first pixels satisfies the second threshold, the processing device 112 may determine that the row is involved (or to be involved) in the first noise reduction operation. For each first pixel in a row involved (or to be involved) in the first noise reduction operation, the processing device 112 may then determine (e.g., according to operation 710) whether the each first pixel in the row involved (or to be involved) in the first noise reduction operation is involved (or to be involved) in the determination of the first noise value. For example, the processing device 112 may determine an absolute value of an interframe difference for the each first pixel in the row involved (or to be involved) in the first noise reduction operation satisfies the first threshold. In response to a determination that an absolute value of an interframe difference for a first pixel in a row of first pixels involved (or to be involved) in the first noise reduction operation satisfies the first threshold, the processing device 112 may determine that the first pixel is involved (or to be involved) in the determination of the first noise value for the row involved (or to be involved) in the first noise reduction operation. The processing device 112 may then determine a count of first pixels involved (or to be involved) in the determination of the first noise value in the row involved (or to be involved) in the first noise reduction operation, and a first sum value of interframe differences for the first pixels involved (or to be involved) in the determination of the first noise value in the row involved (or to be involved) in the first noise reduction operation. The processing device 112 may designate a ratio of the first sum value for a row involved in the first noise reduction operation to the count of first pixels involved in the determination of the first noise value in the row as the first noise value for the row. Accordingly, for the row that is not involved (or not to be involved) in the first noise reduction operation, the processing device 112 may not need to perform a determination of whether the each first pixel in the row is involved in the determination of the first noise value. The processing speed of first noise reduction may be improved.

Figure 8:
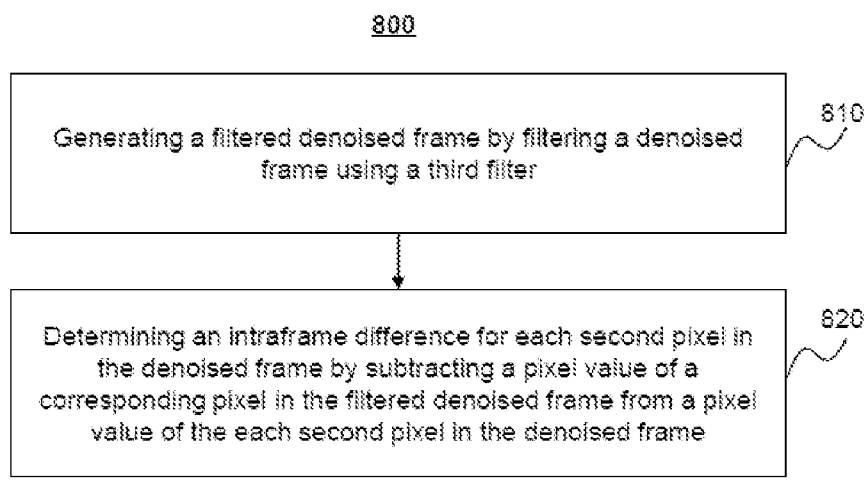
FIG. 8 is a flowchart illustrating an exemplary process for determining an intraframe difference for each second pixel in a denoised frame according to some embodiments of the present disclosure.

FIG. 8 is a flowchart illustrating an exemplary process for determining an intraframe difference for each second pixel in a denoised frame according to some embodiments of the present disclosure. The process 800 may be executed by the image processing system 100. For example, the process 800 may be implemented as a set of instructions stored in the storage 390. The processor 220 and/or the module(s) in FIG. 4 may execute the set of instructions, and when executing the instructions, the processor 220 and/or the module(s) may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process 800 as illustrated in FIG. 8 and described below is not intended to be limiting. In some embodiments, operation 540 illustrated in FIG. 5 may be performed according to the process 800.

In 810, the processing device 112 (e.g., the intraframe difference determination module 440) may generate a filtered denoised frame by filtering a denoised frame using a third filter.

In some embodiments, after the filtering operation is performed on the denoised frame, the denoised frame may include residual noise information of a motion area and/or blurred scene edge information. In some embodiments, the third filter may be a linear filter, a nonlinear filter, or the like. In some embodiments, the first filter may be a mean filter, a median filter, an adaptive filter, a wiener filter, a max and min filter, a midpoint filter, an alpha-trimmed mean filter, or the like.

In some embodiments, the third filter may include a third edge-preserving filter. In some embodiments, the third edge-preserving filter may include a mean filter (e.g., a threshold based mean filter), a median filter (e.g., a threshold based median filter), a bilateral filter, a guided filter, an anisotropic diffusion filter, a weighted least square filter, or the like. The type of the third filter may be the same as or different from the type of the first filter (or the second filter). In some embodiments, if the type of the third filter is the same as the type of the first filter (or the second filter), the parameter(s) (e.g., a window size) of the third filter may be the same as or different from the parameters(s) of the first filter (or the second filter). The third filter may have a third filter window. In some embodiments, a size of the third filter window (also referred to as a third window size of the third filter) may be m (row) xl (column), in which m may be an integer greater than 1 and no greater than a number or count of the rows of second pixels in the denoised frame. For example, the third filter window with a size of m×l may cover m rows of second pixels and one column of second pixels in the denoised frame. The filtering process of the denoised frame may be similar to the filtering process of the current frame (or the previous frame) as described in connection with operation 610 (or operation 620).

In 820, the processing device 112 (e.g., the intraframe difference determination module 440) may determine an intraframe difference for each second pixel in the denoised frame, e.g., by subtracting a pixel value of a corresponding pixel in the filtered denoised frame from a pixel value of the each second pixel in the denoised frame.

In some embodiments, the processing device 112 may determine the intraframe difference for a second pixel in the denoised frame by performing a subtraction operation on the pixel value of the second pixel in the denoised frame and the pixel value of a corresponding pixel in the filtered denoised frame. For example, the processing device 112 may determine the intraframe difference for the second pixel in the denoised frame according to Equation (4):

$$\text{Diff2D}_{i,j} = \text{Out3D}_{i,j} - \text{Out3D}'_{i,j}, \tag{4}$$

where $\text{Diff2D}_{i,j}$ refers to an intraframe difference for a second pixel in the denoised frame; $\text{Out3D}_{i,j}$ refers to a pixel value of the second pixel in the denoised frame; $\text{Out3D}'_{i,j}$ refers to a pixel value of a corresponding pixel in the filtered denoised frame; i refers to an ith row; and j refers to a jth column.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 9:
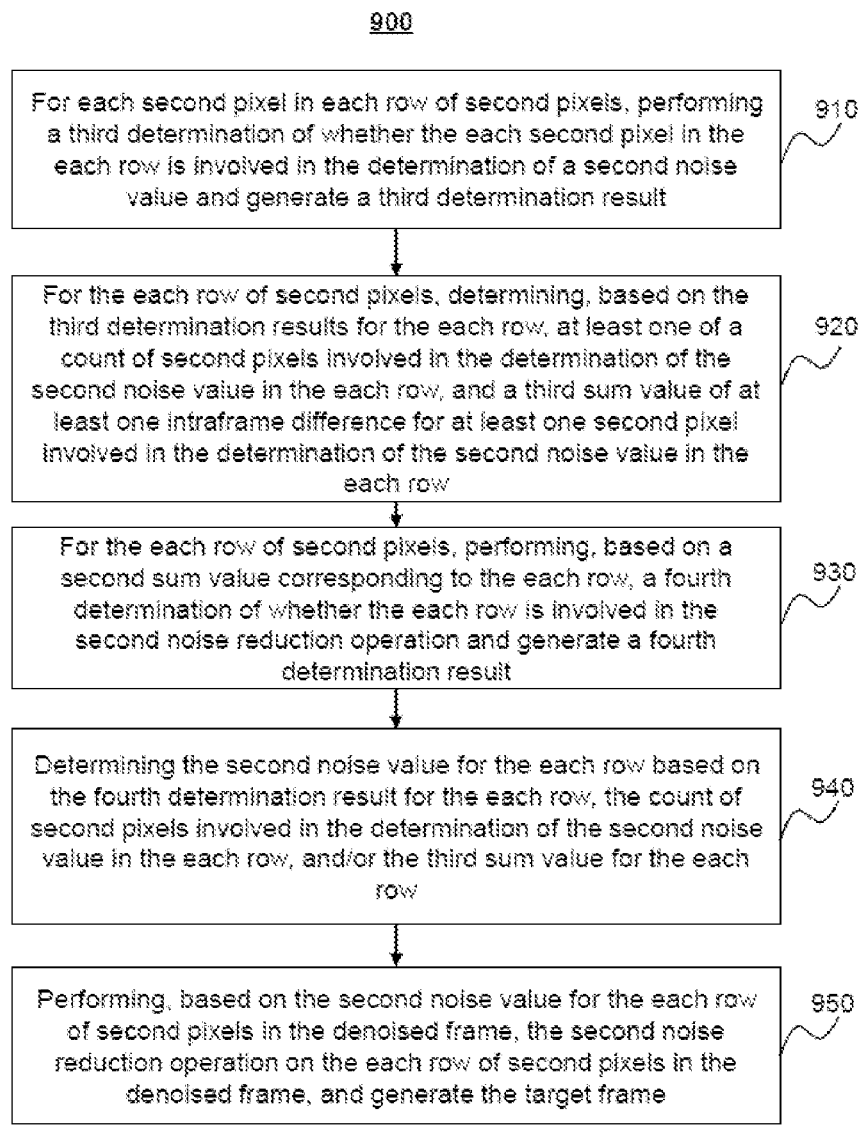
FIG. 9 is a flowchart illustrating an exemplary process for generating a target frame according to some embodiments of the present disclosure.

FIG. 9 is a flowchart illustrating an exemplary process for generating a target frame according to some embodiments of the present disclosure. The process 900 may be executed by the image processing system 100. For example, the process 900 may be implemented as a set of instructions stored in the storage 390. The processor 220 and/or the module(s) in FIG. 4 may execute the set of instructions, and when executing the instructions, the processor 220 and/or the module(s) may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process 900 as illustrated in FIG. 9 and described below is not intended to be limiting. In some embodiments, operation 550 illustrated in FIG. 5 may be performed according to the process 900.

In 910, for each second pixel in each row of second pixels, the processing device 112 (e.g., the second processing module 450) may perform a third determination of whether the each second pixel in the each row is involved (or to be involved) in the determination of a second noise value, and generate a third determination result. A second pixel in a row is involved (or to be involved) in the determination of a second noise value for the row may refer that a pixel value of the second pixel may be counted in the determination of the second noise value for the row, i.e., the second noise value for the row is related to the second pixel. A second pixel in a row is not involved (or not to be involved) in the determination of a second noise value for the row may refer that a pixel value of the second pixel may not be counted in the determination of the second noise value for the row, i.e., the second noise value for the row is not related to the second pixel. In some embodiments, a third determination result may be generated for each second pixel in a row, and accordingly, a plurality of third determination results may be generated for the row.

In some embodiments, the processing device 112 may determine whether a second pixel in a row is involved (or to be involved) in the determination of the second noise value by determining whether the second pixel in the row is substantially affected (e.g., blurred) by residual noises (e.g., dynamic stripe noises). In some embodiments, the processing device 112 may determine whether a second pixel in a row is substantially affected (e.g., blurred) by residual noises (e.g., dynamic stripe noises) based on an intraframe difference for the second pixel in the row and a third threshold.

In some embodiments, the processing device 112 may determine whether an absolute value of an intraframe difference for a second pixel in a row satisfies the third threshold. For example, the processing device 112 may determine whether the absolute value of the intraframe difference for the second pixel in the row is less than the third threshold. In response to a determination that the absolute value of the intraframe difference for the second pixel in the row of second pixels satisfies the third threshold (e.g., the absolute value of the intraframe difference for the second pixel in the row is less than the third threshold), the processing device 112 may determine that the second pixel is substantially affected (e.g., blurred) by residual noises (e.g., dynamic stripe noises), and the second pixel is involved (or to be involved) in the determination of the second noise value for the row. In response to a determination that the absolute value of the intraframe difference for the second pixel in the row of second pixels does not satisfies the third threshold (e.g., the absolute value of the intraframe difference for the second pixel in the row of second pixels is greater than the third threshold), the processing device 112 may determine that the second pixel is affected (e.g., blurred) by scene edges and/or detail information, and the second pixel is not involved (or not to be involved) in the determination of the second noise value for the row.

It should be noted that if an absolute value of an intraframe difference for a second pixel in a row of second pixels is equal to the third threshold, the processing device 112 may either determine that the second pixel is involved (or to be involved) in the determination of the second noise value for the row, or determine that the second pixel is not involved (or not to be involved) in the determination of the second noise value for the row.

In some embodiments, the third threshold may be used to distinguish scene information and noise information in the denoised frame. For example, the third threshold may be used to determine whether the each second pixel in the row is substantially affected (e.g., blurred) by residual noises (e.g., dynamic stripe noises). In some embodiments, the third threshold may be a brightness threshold, a grayscale threshold, or the like. In some embodiments, the third threshold may be a default parameter stored in a storage device (e.g., the storage device 140). Additionally or alternatively, the third threshold may be set manually by a user of the image processing system 100, or determined by one or more components (e.g., the processing device 112) of the image processing system 100 according to situations. For example, the third threshold may be determined by a user of the image processing system 100 based on experience. As another example, the third threshold may be determined based on noise information (e.g., a noise amplitude) and/or scene information in the denoised frame. As still another example, the third threshold may be determined based on a bit width of the denoised frame. In some embodiments, for a denoised frame with a bit width of 14 bits, the third threshold may be in a range from 0 to 32. For example, the third threshold may be in a range from 10 to 20. As another example, the third threshold may be 15.

In 920, for the each row of second pixels, the processing device 112 (e.g., the second processing module 450) may determine, based on the third determination results for the each row, at least one of a count of second pixels involved (or to be involved) in the determination of the second noise value in the each row, and a third sum value of at least one intraframe difference for at least one second pixel involved (or to be involved) in the determination of the second noise value in the each row. In some embodiments, the third sum value for a row may refer to a sum of intraframe differences for the second pixels involved (or to be involved) in the determination of the second noise value in the row.

For illustration purposes, for an ith row of second pixels in the denoised frame, the processing device 112 may perform the third determination of whether each second pixel in the ith row is involved (or to be involved) in the determination of the second noise value for the ith row. Assuming that, before the third determination is performed on a jth second pixel in the ith row, the processing device 112 determines that a count of second pixels involved (or to be involved) in the determination of the second noise value in the ith row is $Num2D_{i,j-1}$, and a third sum value of the intraframe differences for the second pixels involved (or to be involved) in the determination of the second noise value in the ith row is $Sum2D_{i,j-1}$, then the processing device 112 may determine whether the jth pixel in the ith row is involved (or to be involved) in the determination of the second noise value according to the operation 910. If the jth second pixel in the ith row is involved (or to be involved) in the determination of the second noise value, the processing device 112 may determine that the count of second pixels involved in the determination of the second noise value in the ith row is $\text{Num2D}_i = \text{Num2D}_{i,j-1} + 1$, and the third sum value of the intraframe differences for the second pixels involved (or to be involved) in the determination of the second noise value in the ith row is $\text{Sum2D}_{i,j} = \text{Sum2D}_{i,j-1} + \text{Diff2D}_{i,j}$, in which $\text{Diff2D}_{i,j}$ refers to an intraframe difference for the jth second pixel in the ith row. If the jth second pixel in the ith row is not involved (or not to be involved) in the determination of the second noise value, the processing device 112 may determine that the count of second pixels involved (or to be involved) in the determination of the second noise value in the ith row is still $\text{Num2D}_{i,j-1}$, and the third sum value of the intraframe differences for the second pixels involved (or to be involved) in the determination of the second noise value in the ith row is still $\text{Sum2D}_{i,j-1}$. Similarly, the processing device 112 may perform the third determination on one or more other second pixels (e.g., a (j+1)th second pixel, a (j+2)th second pixel, . . . ) in the ith row of the denoised frame. The processing device 112 may update the count of second pixels involved (or to be involved) in the determination of the second noise value in the ith row, and the third sum value of the intraframe differences for the second pixels involved (or to be involved) in the determination of the second noise value in the ith row based on the one or more third determination results for the one or more other second pixels in the ith row.

In 930, for the each row of second pixels, the processing device 112 (e.g., the second processing module 450) may perform, based on a second sum value corresponding to the each row, a fourth determination of whether the each row is involved in the second noise reduction operation and generate a fourth determination result. A row is involved (or to be involved) in the second noise reduction operation may refer that second pixels in the row may be processed in the second noise reduction operation, i.e., the second noise reduction operation may be performed on the second pixels in the row. A row is not involved (or not to be involved) in the second noise reduction operation may refer that second pixels in the row may not be processed in the second noise reduction operation, i.e., the second noise reduction operation may not be performed on the second pixels in the row. In some embodiments, a fourth determination result may be generated for each row in the denoised frame, and accordingly, a plurality of fourth determination results may be generated for the denoised frame.

In some embodiments, the processing device 112 may determine whether a row is involved (or to be involved) in the second noise reduction operation by determining whether the row is located in a motion area in the denoised frame. In some embodiments, the processing device 112 may determine whether a row is located in the motion area in the denoised frame based on the second sum value corresponding to the row and a fourth threshold. The second sum value corresponding to the row of second pixels may refer to a second sum value for a row of first pixels in the current frame corresponding to the row of second pixels in the denoised frame, as described in connection with operation 730.

In some embodiments, the processing device 112 may determine whether an absolute value of the second sum value corresponding to the row satisfies the fourth threshold. For example, the processing device 112 may determine whether the absolute value of the second sum value corresponding to the row is greater than a fourth threshold. In response to a determination that the absolute value of the second sum value corresponding to the row of second pixels satisfies the fourth threshold (e.g., the absolute value of the second sum value corresponding to the row of second pixels is greater than the fourth threshold), the processing device 112 may determine that a probability of the row being located in a motion area is relatively high, and the row is involved (or to be involved) in the second noise reduction operation. In response to a determination that the absolute value of the second sum value corresponding to the row of second pixels does not satisfy the fourth threshold (e.g., the absolute value of the second sum value corresponding to the row of second pixels is less than the fourth threshold), the processing device 112 may determine that the probability of the row being located in a motion area is relatively low, and the row is not involved (or not to be involved) in the second noise reduction operation.

It should be noted that if an absolute value of a second sum value corresponding to a row of second pixels is equal to the fourth threshold, the processing device 112 may either determine that the row is involved (or to be involved) in the second noise reduction operation, or determine that the row is not involved (or not to be involved) in the second noise reduction operation.

In some embodiments, the fourth threshold may be used to distinguish scene information and noise information in the denoised frame. For example, the fourth threshold may be used to determine whether the each row is located in a motion area in the denoised frame. In some embodiments, the fourth threshold may be a brightness threshold, a grayscale threshold, or the like. In some embodiments, the fourth threshold may be a default parameter stored in a storage device (e.g., the storage device 140). Additionally or alternatively, the fourth threshold may be set manually by a user of the image processing system 100, or determined by one or more components (e.g., the processing device 112) of the image processing system 100 according to situations. For example, the fourth threshold may be determined by a user of the image processing system 100 based on experience. As another example, the fourth threshold may be determined based on noise information (e.g., a noise amplitude) and/or scene information in the current frame. As still another example, the fourth threshold may be determined based on a bit width of the denoised frame. In some embodiments, for a denoised frame with a bit width of 14 bits, the fourth threshold may be in a range from 0 to 256. For example, the fourth threshold may be in a range from 50 to 150. As another example, the fourth threshold may be 100.

In 940, the processing device 112 (e.g., the second processing module 450) may determine the second noise value for the each row based on the fourth determination result for the each row, the count of second pixels involved (or to be involved) in the determination of the second noise value in the each row, and/or the third sum value for the each row.

In some embodiments, in response to a determination that a row is involved (or to be involved) in the second noise reduction operation, the processing device 112 may determine an average value of the intraframe differences for the second pixels involved (or to be involved) in the determination of the second noise value in the row as the second noise value for the row. For example, the processing device 112 may designate a ratio of the third sum value for the row to the count of second pixels involved (or to be involved) in the determination of the second noise value in the row as the second noise value for the row. In response to a determination that a row is not involved (or not to be involved) in the second noise reduction operation, the processing device 112 may designate 0 as the second noise value for the row.

For illustration purposes, assuming that the processing device 112 determines that a count of second pixels involved (or to be involved) in the determination of the second noise value in the ith row is Num2D$_i$, a third sum value of the intraframe differences for the second pixels involved (or to be involved) in the determination of the second noise value in the ith row is Sum2D$_i$, and a second sum value of the interframe differences for all the first pixels in a row in the current frame corresponding to the ith row in the denoised frame is SumRowDiff2D$_i$, then the processing device 112 may compare an absolute value of the second sum value (e.g., |SumRowDiff2D$_i$|) corresponding to the ith row and a fourth threshold (e.g., thRowDiff2). If the absolute value of the second sum value corresponding to the ith row is greater than the fourth threshold (i.e., |SumRowDiff2D$_i$|>thRowDiff2), that is, the ith row is involved (or to be involved) in the second noise reduction operation, then the processing device 112 may determine the second noise value for the ith row according to Equation (5):

$$Noise2D_i = \frac{Sum2D_i}{Num2D_i}, \qquad (5)$$

where Noise2D$_i$ refers to the second noise value for the ith row in the denoised frame; Sum2D$_i$ refers to the third sum value of intraframe differences for the second pixels involved (or to be involved) in the determination of the second noise value in the ith row in the denoised frame; and Num2D$_i$ refers to the count of second pixels involved (or to be involved) in the determination of the second noise value in the ith row in the denoised frame. If the absolute value of the second sum value corresponding to the ith row is less than the fourth threshold (i.e., |SumRowDiff2D$_i$|<thRowDiff2), that is, the ith row is not involved (or not to be involved) in the second noise reduction operation, the processing device 112 may designate 0 as the second noise value for the ith row. That is, the processing device 112 may not perform the second noise reduction operation on the ith row of second pixels in the denoised frame. If the absolute value of the second sum value corresponding to the i th row is equal to the fourth threshold (i.e., |SumRowDiff2D$_i$|=thRowDiff2), the processing device 112 may either determine that the ith row is involved (or to be involved) in the second noise reduction operation, or determine that the ith row is not involved (or not to be involved) in the second noise reduction operation.

In 950, the processing device 112 (e.g., the second processing module 450) may perform, based on the second noise value for the each row of second pixels in the denoised frame, the second noise reduction operation on the each row of second pixels (that are involved in the second noise reduction operation) in the denoised frame, and generate the target frame.

In some embodiments, the processing device 112 may perform the second noise reduction operation on a row of second pixels in the denoised frame according to Equation (6):

$$Output_{i,j} = Out3D_{i,j} - Noise2D_i, \qquad (6)$$

where Output$_{i,j}$ refers to a value of a corresponding target pixel in a target frame; Out3D$_{i,j}$ refers to a value of a second pixel in a denoised frame; and Noise2D$_i$ refers to a second noise value for the ith row in the denoised frame; i refers to an ith row; and j refers to a jth column. The processing device 112 may determine the target frame based on a plurality of values of target pixels in the target frame.

Accordingly, the second noise reduction operation may be performed on the each row of second pixels in the denoised frame based on the second noise value for the each row of second pixels in the denoised frame. Intraframe dynamic stripe noises in the denoised frame may be reduced targetedly. The effect of the second noise reduction operation may be improved.

According to some embodiments of the present disclosure, dynamic stripe noises in a previous frame may be blurred by filtering the previous frame using an edge-preserving filter. Dynamic stripe noises in a current frame may be corrected based on the filtered previous frame. For example, an interframe difference between each first pixel in the current frame and a corresponding pixel in the previous frame may be determined. At least one first pixel and/or at least one row of first pixels in a motion area in the current frame may be excluded from the plurality of first pixels in the current frame (i.e., may not be involved in a first noise reduction operation) based on the interframe difference for the each first pixel in the current frame, a first threshold, and/or a second threshold, as described elsewhere in the present disclosure (e.g., FIG. 7 and descriptions thereof). A first noise value for each row of first pixels in the current frame may be determined. A first noise reduction operation (e.g., an interframe noise reduction operation) may be performed on the each row of first pixels in the current frame (that are involved in the first noise reduction operation) based on the first noise value for the each row of first pixels in the current frame, and a denoised frame may be generated. An intraframe difference for each second pixel in the denoised frame may be determined based on a filtered denoised frame and the denoised frame. At least one second pixel affected (e.g., blurred) by scene edges and detail information may be excluded from the plurality of second pixels in the denoised frame (i.e., may not be involved in the determination of a second noise value) based on the intraframe difference for the each second pixel in the denoised frame and a third threshold. At least one row of second pixels located in a stationary area (e.g., a probability of the at least one row being located in a stationary area is greater than a threshold) of the denoised frame may be excluded from the plurality of second pixels in the denoised frame (i.e., may not be involved in a second noise reduction operation) based on the intraframe difference for the each second pixel in the denoised frame and a fourth threshold. A second noise value for the each row of second pixels in the denoised frame may be determined. A second noise reduction operation may be performed on the each row of second pixels in the denoised frame (that are involved in the second noise reduction operation) based on the second noise value for the each row of second pixels in the denoised frame, and a target frame may be generated. Accordingly, the systems and methods described in the present disclosure may reduce horizontal dynamic stripe noises in a frame caused by a structure of an infrared imaging device that acquires the frame effectively and targetedly, so that flickering horizontal stripes may not be substantially observed in the frame.

In some embodiments, operation 930 may be performed before operation 910. For example, the processing device 112 may determine whether the each row is involved (or to be involved) in the second noise reduction operation based on the second sum value corresponding to the each row. In response to a determination that an absolute value of a second sum value corresponding to a row of second pixels does not satisfy the fourth threshold, the processing device 112 may determine that the row is not involved (or not to be involved) in the second noise reduction operation. The processing device 112 may designate 0 as the second noise value for the row that is not involved (or not to be involved) in the second noise reduction operation.

In response to a determination that an absolute value of a second sum value corresponding to a row of second pixels satisfies the fourth threshold, the processing device 112 may determine that the row is involved (or to be involved) in the second noise reduction operation. For each second pixel in a row involved (or to be involved) in the second noise reduction operation, the processing device 112 may determine (e.g., according to operation 910) whether the each second pixel in the row involved (or to be involved) in the second noise reduction operation is involved (or to be involved) in the determination of the second noise value. For example, the processing device 112 may determine an absolute value of an intraframe difference for the each second pixel in the row involved (or to be involved) in the second noise reduction operation satisfies the third threshold. In response to a determination that an absolute value of an intraframe difference for a second pixel in a row of second pixels involved (or to be involved) in the second noise reduction operation satisfies the third threshold, the processing device 112 may determine that the second pixel is involved (or to be involved) in the determination of the second noise value for the row involved (or to be involved) in the second noise reduction operation. The processing device 112 may determine a count of second pixels involved (or to be involved) in the determination of the second noise value in the row involved (or to be involved) in the second noise reduction operation, and a third sum value of intraframe differences for the second pixels involved (or to be involved) in the determination of the second noise value in the row involved (or to be involved) in the second noise reduction operation. The processing device 112 may designate a ratio of the third sum value for a row involved in the second noise reduction operation to the count of second pixels involved in the determination of the second noise value in the row as the second noise value for the row. Accordingly, for the row that is not involved (or not to be involved) in the second noise reduction operation, the processing device 112 may not need to perform a determination of whether the each second pixel in the row is involved in the determination of the second noise value. The processing speed of second noise reduction may be improved.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, one or more operations may be added in process 900. For example, an operation for correcting a target frame may be added after operation 950. In some embodiments, the processing device 112 (e.g., the correction module 460) may perform a brightness correction operation on the target frame based on the first noise value for the each row of first pixels in the current frame. In some embodiments, the processing device 112 may determine an average value of the first noise values for the rows of first pixels in the current frame that are involved in the first noise reduction operation. For example, the processing device 112 may determine a ratio of a sum value of the first noise values for the rows involved in the first noise reduction operation to a number (or count) of the rows involved in the first noise reduction operation as the average value of the first noise values for the rows of first pixels in the current frame. In some embodiments, the processing device 112 may determine a corrected target frame based on the average value. For example, the processing device 112 may determine the corrected target frame according to Equation (7):

$$\text{OutputFinal}_{i,j} = \text{Output}_{i,j} + \text{Noise3DMean} \times \text{alpha}, \quad (7)$$

where $\text{OutputFinal}_{i,j}$ refers to a value of a corresponding pixel in a corrected target frame; $\text{Output}_{i,j}$ refers to a value of a target pixel in the target frame; Noise3DMean refers to the average value of the first noise values for the rows involved in the first noise reduction operation; and alpha refers to a correction parameter, $0 \le \text{alpha} \le 1$; i refers to an ith row; and j refers to a jth column.

According to some embodiments of the present disclosure, the first noise values for the rows in the current frame determined based on interframe differences for first pixels in the current frame may include noise information (e.g., dynamic stripe noises) associated with the current frame, and/or brightness change information associated with the current frame. After the first noise reduction operation is performed on the current frame, the brightness change information associated with the current frame may be suppressed, and accordingly the brightness change information may be lost in the target frame. Therefore, the target frame may be corrected based on the first noise values for the rows of first pixels in the current frame to restore the brightness change information. Furthermore, the brightness correction operation performed on the target frame may avoid a failure of the first threshold due to the brightness change.

Figure 10:
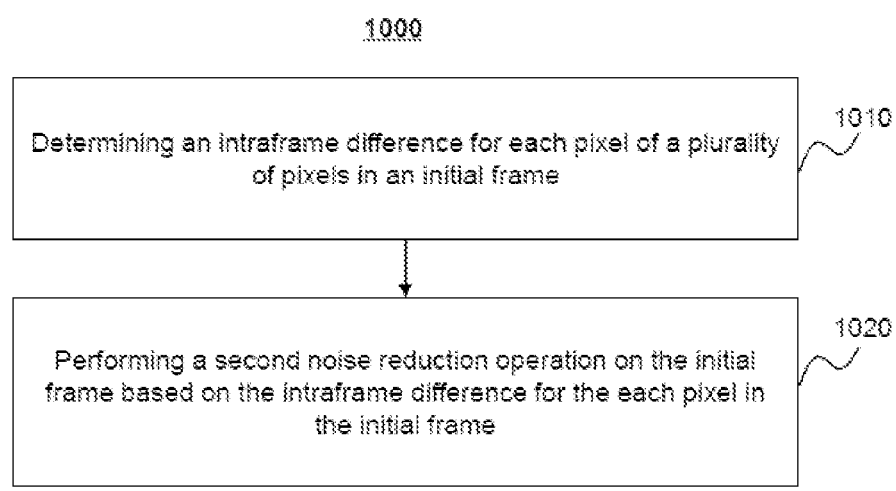
FIG. 10 is a flowchart illustrating an exemplary process for noise reduction of an initial frame according to some embodiments of the present disclosure.

FIG. 10 is a flowchart illustrating an exemplary process for noise reduction of an initial frame according to some embodiments of the present disclosure. The process 1000 may be executed by the image processing system 100. For example, the process 1000 may be implemented as a set of instructions stored in the storage 390. The processor 220 and/or the module(s) in FIG. 4 may execute the set of instructions, and when executing the instructions, the processor 220 and/or the module(s) may be configured to perform the process 1000. The operations of the illustrated process presented below are intended to be illustrative. In some embodiments, the process 1000 may be accomplished with one or more additional operations not described and/or without one or more of the operations discussed. Additionally, the order in which the operations of the process 1000 as illustrated in FIG. 10 and described below is not intended to be limiting. In some embodiments, the process 1000 may be performed before operation 510 illustrated in FIG. 5.

In some embodiments, for an initial frame in a frame set, the processing device 112 may only perform a second noise reduction operation (e.g., an intraframe noise reduction operation) on the initial frame. In 1010, the processing device 112 (e.g., the intraframe difference determination module 440) may determine an intraframe difference for each pixel of a plurality of pixels in the initial frame. In some embodiments, the processing device 112 may generate a filtered initial frame by filtering the initial frame using a fourth filter. In some embodiments, the fourth filter may be an edge-preserving filter. The edge-preserving filter may include a mean filter (e.g., a threshold based mean filter), a median filter (e.g., a threshold based median filter), a bilateral filter, a guided filter, an anisotropic diffusion filter, a weighted least square filter, or the like. In some embodiments, the processing device 112 may determine the intraframe difference for the each pixel in the initial frame by subtracting a pixel value of a corresponding pixel in the filtered initial frame from a pixel value of the each pixel in the initial frame.

In 1020, the processing device 112 (e.g., the second processing module 450) may perform a second noise reduction operation on the initial frame based on the intraframe difference for the each pixel in the initial frame. The second noise reduction operation performed on the initial frame may be similar to the second noise reduction operation performed on the denoised frame as described in connection with operation 950.

In some embodiments, in the operation of the second noise reduction algorithm (i.e., the intraframe noise reduction algorithm), a plurality of iterations may be performed to converge. In some embodiments, in order to accelerate the convergence of the second noise reduction algorithm, an initialization operation may be performed based on the second noise reduction algorithm. For example, the second noise reduction operation may be performed on each row of a plurality of rows of pixels in the initial frame.

In some embodiments, for each row of pixels in the initial frame, the processing device 112 may determine a fifth sum value of multiple intraframe differences for multiple pixels in the each row. The processing device 112 may perform a fifth determination of whether the each row is involved in the second noise reduction operation based on the sum value for the each row and a fifth threshold. For example, the processing device 112 may determine whether the sum value for the each row satisfies the fifth threshold (e.g., greater than the fifth threshold). In response to a determination that a sum value for a row satisfies the fifth threshold, the processing device 112 may determine that the row is involved (or to be involved) in the second noise reduction operation. In some embodiments, the processing device 112 may designate the fifth threshold as 0. That is, the processing device 112 may perform the second noise reduction operation on the each row of the plurality of rows of pixels in the initial frame. Accordingly, the second noise reduction algorithm may be enhanced and the initialization of the second noise reduction operation may be accelerated.

In some embodiments, the current frame may include column noises (e.g., vertical stripe noises). The column noise reduction process may be similar to the row noise reduction process, as described in connection with process 600, process 700, process 800, and process 900. In some embodiments, after the current frame is obtained, for each first pixel of a plurality of first pixels in the current frame, the processing device 112 may determine an interframe difference between the each first pixel in the current frame and a corresponding pixel in a previous frame obtained prior to the current frame. For example, the processing device 112 may generate a filtered current frame by filtering the current frame using a first filter (e.g., a first edge-preserving filter). In some embodiments, a first window size of the first filter may be m (row) xl (column), m may be an integer greater than 1 and no greater than a number or count of rows of first pixels in the current frame. The processing device 112 may generate a filtered previous frame by filtering the previous frame using a second filter (e.g., a second edge-preserving filter). In some embodiments, a second window size of the second filter may be may be m (row)×n (column), in which m may be an integer greater than 1 and no greater than a number or count of rows of pixels in the previous frame, and n may be an integer greater than 1 and no greater than a number or count of columns of pixels in the previous frame. The processing device 112 may determine the interframe difference for the each first pixel in the current frame by subtracting a pixel value of a corresponding pixel in the filtered previous frame from a pixel value of a corresponding pixel in the filtered current frame.

In some embodiments, the processing device 112 may determine a first noise value for each column of first pixels in the current frame based on the interframe difference for the each first pixel in the current frame. For example, for each first pixel in the each column of first pixels, the processing device 112 may perform a first determination of whether the each first pixel in the each column is involved in the determination of the first noise value and generate a first determination result. For the each column of first pixels, the processing device 112 may determine, based on the first determination results for the each column, at least one of a count of first pixels involved in the determination of the first noise value in the each column, and a first sum value of at least one interframe difference for at least one first pixel involved in the determination of the first noise value in the each column. For the each column of first pixels, the processing device 112 may determine a second sum value of multiple interframe differences for multiple first pixels in the each column. For the each column of first pixels, the processing device 112 may perform, based on the second sum value for the each column, a second determination of whether the each column is involved in the first noise reduction operation to generate a second determination result. The processing device 112 may determine the first noise value for the each column based on the second determination result for the each column, the count of first pixels involved in the determination of the first noise value in the each column, and/or the first sum value for the each column. The processing device 112 may perform, based on the first noise value for the each column of first pixels in the current frame, the first noise reduction operation on the each column of first pixels in the current frame, and generate the denoised frame.

The processing device 112 may determine an intraframe difference for each second pixel of a plurality of second pixels in the denoised frame. For example, the processing device 112 may generate a filtered denoised frame by filtering the denoised frame using a third filter (e.g., a third edge-preserving filter). In some embodiments, a third window size of the third filter may be 1 (row)×n (column), and n may be an integer greater than 1 and no greater than a number or count of columns of second pixels in the denoised frame. The processing device 112 may determine the intraframe difference for each second pixel in the denoised frame by subtracting a pixel value of a corresponding pixel in the filtered denoised frame from a pixel value of the each second pixel in the denoised frame.

The processing device 112 may determine a second noise value for each column of second pixels in the denoised frame based on the intraframe difference for the each second pixel in the denoised frame. For example, for each second pixel in the each column of second pixels, the processing device 112 may perform a third determination of whether the each second pixel in the each column is involved in the determination of the second noise value and generate a third determination result. For the each column of second pixels, the processing device 112 may determine, based on the third determination results for the each column, at least one of a count of second pixels involved in the determination of the second noise value in the each column, and a third sum value of at least one intraframe difference for at least one second pixel involved in the determination of the second noise value in the each column. For the each column of second pixels, the processing device 112 may perform, based on the second sum value corresponding to the each row, a fourth determination of whether the each column is involved in the second noise reduction operation and generate a fourth determination result. The processing device 112 may determine the second noise value for the each column based on the fourth determination result for the each column, the count of second pixels involved in the determination of the second noise value in the each column, and/or the third sum value for the each column. The processing device 112 may perform, based on the second noise value for the each column of second pixels in the denoised frame, the second noise reduction operation on the each column of second pixels in the denoised frame, and generate the target frame.

Accordingly, the systems and methods described in the present disclosure may reduce vertical dynamic stripe noises in a frame caused by a structure of an infrared imaging device that acquires the frame effectively and targetedly, so that flickering vertical stripes may not be substantially observed in the frame.

In some embodiments, the current frame may include both row noises (e.g., horizontal stripe noises) and column noises (e.g., vertical stripe noises). In some embodiments, the processing device 112 may reduce the row noises in the current frame to generate a first target frame, as described in connection with process 600 to process 900. The processing device 112 may then reduce the column noises in the first target frame to generate a second target frame, as described above. In some embodiments, the processing device 112 may reduce the column noises in the current frame to generate a first target frame, as described above. The processing device 112 may then reduce the row noises in the first target frame to generate a second target frame, as described in connection with process 600 to process 900.

Accordingly, the systems and methods described in the present disclosure may reduce horizontal and vertical dynamic stripe noises in a frame caused by a structure of an infrared imaging device that acquires the frame effectively and targetedly, so that flickering horizontal and vertical stripes may not be substantially observed in the frame.

Figure 11:
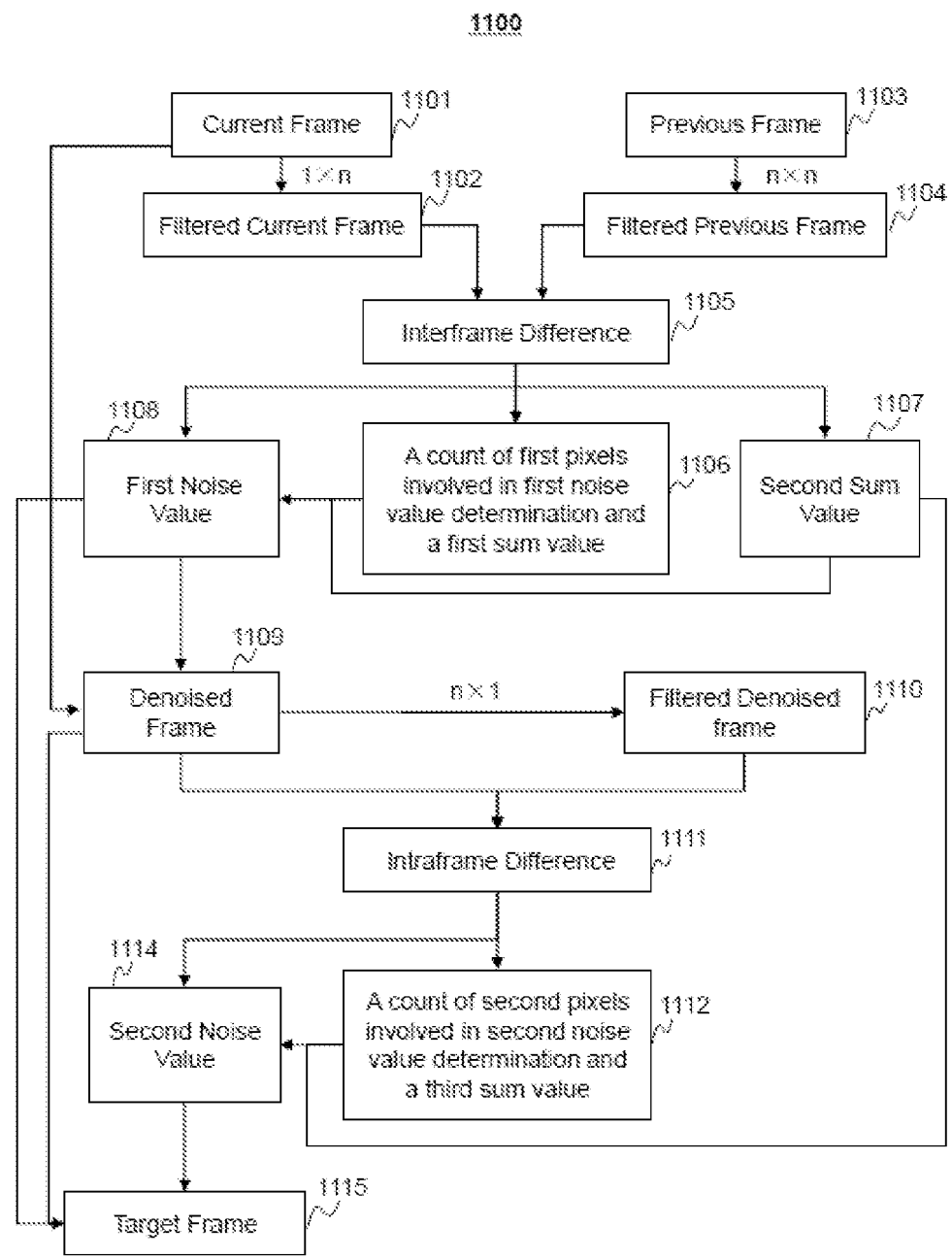
FIG. 11 is a schematic diagram illustrating an exemplary process for generating a target frame according to some embodiments of the present disclosure.

FIG. 11 is a schematic diagram illustrating an exemplary process for generating a target frame according to some embodiments of the present disclosure.

As illustrated in FIG. 11, a process 1100 for reducing horizontal stripe noises in a current frame is taken as an example. In 1101, the processing device 112 may obtain the current frame, as described in connection with operation 510. The current frame may include a plurality of first pixels arranged in a plurality of rows and a plurality of columns In 1102, the processing device 112 may generate a filtered current frame by filtering the current frame using a first filter (e.g., a first edge-preserving filter), as described in connection with operation 610. In some embodiments, a first window size of the first filter may be 1 (row)×n (column), n may be an integer greater than 1 and no greater than a count of columns of first pixels in the current frame. In 1103, the processing device 112 may obtain a previous frame obtained prior to the current frame, as described in connection with operation 510. In 1104, the processing device 112 may generate a filtered previous frame by filtering the previous frame using a second filter (e.g., a second edge-preserving filter), as described in connection with operation 620. In some embodiments, a second window size of the second filter may be m (row)×n (column), in which m may be an integer greater than 1 and no greater than a number or count of rows of pixels in the previous frame, and n may be an integer greater than 1 and no greater than a number or count of columns of pixels in the previous frame. In 1105, the processing device 112 may determine an interframe difference for the each first pixel in the current frame based on the filter current frame and the filter previous frame, as described in connection with operation 630. For example, the processing device 112 may determine the interframe difference for the each first pixel in the current frame by subtracting a pixel value of a corresponding pixel in the filtered previous frame from a pixel value of a corresponding pixel in the filtered current frame. For each first pixel in the each row of first pixels, the processing device 112 may perform a first determination of whether the each first pixel in the each row is involved in the determination of a first noise value to generate a first determination result, as described in connection with operation 710.

In 1106, for the each row of first pixels, the processing device 112 may determine, based on the first determination results for the each row, a count of first pixels involved in the determination of the first noise value in the each row, and a first sum value of at least one interframe difference for at least one first pixel involved in the determination of the first noise value in the each row as described in connection with operation 720. In 1107, for the each row of first pixels, the processing device 112 may determine a second sum value of multiple interframe differences for multiple first pixels in the each row, as described in connection with operation 730. For the each row of first pixels, the processing device 112 may perform, based on the second sum value for the each row, a second determination of whether the each row is involved in a first noise reduction operation and generate a second determination result, as described in connection with operation 740. In 1108, the processing device 112 may determine the first noise value for the each row based on the second determination result for the each row, the count of first pixels involved in the determination of the first noise value in the each row, and/or the first sum value for the each row, as described in connection with operation 750. In 1109, the processing device 112 may generate a denoised frame by performing, based on the first noise value for the each row of first pixels in the current frame, the first noise reduction operation on the each row of first pixels in the current frame, as described in connection with operation 760. The denoised frame may include a plurality of second pixels.

In 1110, the processing device 112 may generate a filtered denoised frame by filtering the denoised frame using a third filter (e.g., a third edge-preserving filter) as described in connection with operation 810. In some embodiments, a third window size of the third filter may be m (row)×1 (column), m may be an integer greater than 1 and no greater than a number or count of rows of second pixels in the denoised frame. In 1111, the processing device 112 may determine an intraframe difference for each second pixel in the denoised frame based on the denoised frame and the filtered denoised frame, as described in connection with operation 820. For example, the processing device 112 may determine the intraframe difference for the each second pixel in the denoised frame by subtracting a pixel value of a corresponding pixel in the filtered denoised frame from a pixel value of the each second pixel in the denoised frame. For each second pixel in the each row of second pixels, the processing device 112 may perform a third determination of whether the each second pixel in the each row is involved in the determination of the second noise value and generate a third determination result, as described in connection with operation 910.

In 1112, for the each row of second pixels, the processing device 112 may determine, based on the third determination results for the each row, a count of second pixels involved in the determination of the second noise value in the each row, and a third sum value of at least one intraframe difference for at least one second pixel involved in the determination of the second noise value in the each row, as described in connection with operation 920. For the each row of second pixels, the processing device 112 may perform, based on the second sum value corresponding to the each row, a fourth determination of whether the each row is involved in a second noise reduction operation and generate a fourth determination result, as described in connection with operation 930. In 1114, the processing device 112 may determine the second noise value for the each row based on the fourth determination result for the each row, the count of second pixels involved in the determination of the second noise value in the each row, and/or the third sum value for the each row, as described in connection with operation 940. In 1115, the processing device 112 may generate a target frame by performing the second noise reduction operation on the each row of second pixels in the denoised frame based on the second noise value for the each row of second pixels in the denoised frame, as described in connection with operation 950.

In some embodiments, the processing device 112 may perform a brightness correction operation on the target frame based on the first noise value for the each row of first pixels in the current frame, as described elsewhere in the present disclosure (e.g., FIG. 9 and descriptions thereof).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for noise reduction implemented on a computing device having at least one processor and at least one storage device, the method comprising:
   obtaining a current frame including a plurality of first pixels arranged in a plurality of rows and a plurality of columns;
   for each first pixel of the plurality of first pixels in the current frame, determining an interframe difference between the each first pixel in the current frame and a corresponding pixel in a previous frame obtained prior to the current frame by a first filter corresponding to the current frame and a second filter corresponding to the previous frame; wherein the first filter has a first filter window, and a size of the first filter window is 1 row×n column, in which n is an integer greater than 1 and no greater than a number or count of columns of the first pixels in the current frame; the second filter has a second filter window, and a size of the second filter window is m row×n column, in which m is an integer greater than 1 and no greater than a number or count of rows of pixels in the previous frame, and n is an integer greater than 1 and no greater than a number or count of columns of pixels in the previous frame;
   generating a denoised frame by performing, based on the interframe difference for the each first pixel in the current frame, a first noise reduction operation on the current frame, the denoised frame including a plurality of second pixels;
   determining an intraframe difference for each second pixel of the plurality of second pixels in the denoised frame; and
   generating a target frame by performing, based on the intraframe difference for the each second pixel in the denoised frame, a second noise reduction operation on the denoised frame.

2. The method of claim 1, wherein, for the each first pixel of the plurality of first pixels in the current frame, determining an interframe difference between the each first pixel in the current frame and a corresponding pixel in a previous frame obtained prior to the current frame by a first filter corresponding to the current frame and a second filter corresponding to the previous frame further comprises:
   generating a filtered current frame by filtering the current frame using the first filter;
   generating a filtered previous frame by filtering the previous frame using the second filter; and
   determining the interframe difference for the each first pixel in the current frame by subtracting a pixel value of a corresponding pixel in the filtered previous frame from a pixel value of a corresponding pixel in the filtered current frame.

3. The method of claim 1, wherein the generating a denoised frame comprises:
   determining, based on the interframe difference for the each first pixel in the current frame, a first noise value for each row of first pixels in the current frame; and
   performing, based on the first noise value for the each row of first pixels in the current frame, the first noise reduction operation on the each row of first pixels in the current frame, to generate the denoised frame.

4. The method of claim 3, wherein the determining, based on the interframe difference for the each first pixel in the current frame, the first noise value for each row of first pixels in the current frame comprises:
   for each first pixel in the each row of first pixels, performing a first determination of whether the each first pixel in the each row is involved in the determination of the first noise value to generate a first determination result;
   for the each row of first pixels, determining, based on the first determination results for the each row, at least one of a count of first pixels involved in the determination of the first noise value in the each row, or a first sum value of at least one interframe difference for at least one first pixel involved in the determination of the first noise value in the each row;
   for the each row of first pixels, determining a second sum value of multiple interframe differences for multiple first pixels in the each row;
   for the each row of first pixels, performing, based on the second sum value for the each row, a second determination of whether the each row is involved in the first noise reduction operation to generate a second determination result; and
   determining the first noise value for the each row based on at least one of the second determination result for the each row, the count of first pixels involved in the determination of the first noise value in the each row, or the first sum value for the each row.

5. The method of claim 4, wherein, for each first pixel in the each row of first pixels, the performing the first determination of whether the each first pixel in the each row is involved in the determination of the first noise value comprises:
  determining whether an absolute value of an interframe difference for the each first pixel in the each row satisfies a first threshold; and
  in response to a determination that an absolute value of an interframe difference for a first pixel in a row of first pixels satisfies the first threshold, determining that the first pixel is involved in the determination of the first noise value for the row.

6. The method of a claim 4, wherein, for the each row of first pixels, the performing, based on the second sum value for the each row, a second determination of whether the each row is involved in the first noise reduction operation comprises:
  determining whether an absolute value of the second sum value for the each row satisfies a second threshold.

7. The method of claim 6, wherein, for the each row of first pixels, the performing, based on the second sum value for the each row, the second determination of whether the each row is involved in the first noise reduction operation further comprises:
  in response to a determination that an absolute value of a second sum value for a row of first pixels satisfies the second threshold, determining that the row is involved in the first noise reduction operation.

8. The method of claim 6, wherein, for the each row of first pixels, the performing, based on the second sum value for the each row, the second determination of whether the each row is involved in the first noise reduction operation further comprises:
  in response to a determination that an absolute value of a second sum value for a row of first pixels does not satisfy the second threshold, determining that the row is not involved in the first noise reduction operation.

9. The method of claim 4, wherein the determining the first noise value for the each row based on at least one of the second determination result for the each row, the count of first pixels involved in the determination of the first noise value in the each row, or the first sum value for the each row comprises:
  in response to a determination that the each row is involved in the first noise reduction operation, designating a ratio of the first sum value for the each row to the count of first pixels involved in the determination of the first noise value in the each row as the first noise value for the each row.

10. The method of claim 4, wherein the determining the first noise value for the each row based on at least one of the second determination result for the each row, the count of first pixels involved in the determination of the first noise value in the each row, or the first sum value for the each row comprises:
  in response to a determination that the each row is not involved in the first noise reduction operation, designating 0 as the first noise value for the each row.

11. The method of claim 4, wherein the determining the intraframe difference for each second pixel of the plurality of second pixels in the denoised frame comprises:
  generating a filtered denoised frame by filtering the denoised frame using a third filter; and
  determining the intraframe difference for the each second pixel in the denoised frame by subtracting a pixel value of a corresponding pixel in the filtered denoised frame from a pixel value of the each second pixel in the denoised frame.

12. The method of claim 4, wherein the generating the target frame comprises:
  determining, based on the intraframe difference for the each second pixel in the denoised frame, a second noise value for each row of second pixels in the denoised frame; and
  performing, based on the second noise value for the each row of second pixels in the denoised frame, the second noise reduction operation on the each row of second pixels in the denoised frame, to generate the target frame.

13. The method of claim 12, wherein the determining, based on the intraframe difference for the each second pixel in the denoised frame, the second noise value for the each row of second pixels in the denoised frame comprises:
  for each second pixel in the each row of second pixels, performing a third determination of whether the each second pixel in the each row is involved in the determination of the second noise value to generate a third determination result;
  for the each row of second pixels, determining, based on the third determination results for the each row, at least one of a count of second pixels involved in the determination of the second noise value in the each row, or a third sum value of at least one intraframe difference for at least one second pixel involved in the determination of the second noise value in the each row;
  for the each row of second pixels, performing, based on a second sum value for a row of first pixels corresponding to the each row, a fourth determination of whether the each row is involved in the second noise reduction operation to generate a fourth determination result; and
  determining the second noise value for the each row based on at least one of the fourth determination result for the each row, the count of second pixels involved in the determination of the second noise value in the each row, or the third sum value for the each row.

14. The method of claim 13, wherein, for each second pixel in the each row of second pixels, the performing a third determination of whether the each second pixel in the each row is involved in the determination of the second noise value comprises:
  determining whether an absolute value of an intraframe difference for the each second pixel in the each row satisfies a third threshold; and
  in response to a determination that an absolute value of an intraframe difference for a second pixel in a row of second pixels satisfies the third threshold, determining that the second pixel is involved in the determination of the second noise value for the row.

15. The method of claim 13, wherein, for the each row of second pixels, the performing, based on a second sum value for the row of first pixels corresponding to the each row, the fourth determination of whether the each row is involved in the second noise reduction operation comprises:
  determining whether an absolute value of a second sum value for the row of first pixels corresponding to the each row satisfies a fourth threshold.

16. The method of claim 15, wherein, for the each row of second pixels, the performing, based on the second sum value for the row of first pixels corresponding to the each row, the fourth determination of whether the each row is involved in the second noise reduction operation further comprises:
  in response to a determination that an absolute value of a second sum value for a row of first pixels corresponding to a row of second pixels satisfies the fourth threshold, determining that the row is involved in the second noise reduction operation.

17. The method of claim 13, wherein the determining the second noise value for the each row based on at least one of the fourth determination result for the each row, the count of second pixels involved in the determination of the second noise value in the each row, or the third sum value for the each row comprises:
in response to a determination that the each row is involved in the second noise reduction operation, designating a ratio of the third sum value for the each row to the count of second pixels involved in the determination of the second noise value in the each row as the second noise value for the each row.

18. The method of claim 1, wherein the current frame and the previous frame are from a frame set, the frame set includes an initial frame, and the method further comprising:
prior to, for each first pixel in the current frame, determining an interframe difference between the each first pixel in the current frame and a corresponding pixel in a previous frame:
determining an intraframe difference for each pixel of a plurality of pixels in the initial frame; and
performing, based on the intraframe difference for the each pixel in the initial frame, a third noise reduction operation on the initial frame.

19. A system for noise reduction, comprising:
at least one storage medium storing a set of instructions; and
at least one processor in communication with the at least one storage medium, when executing the stored set of instructions, the at least one processor causes the system to:
obtain a current frame including a plurality of first pixels arranged in a plurality of rows and a plurality of columns;
for each first pixel of the plurality of first pixels in the current frame, determine an interframe difference between the each first pixel in the current frame and a corresponding pixel in a previous frame obtained prior to the current frame by a first filter corresponding to the current frame and a second filter corresponding to the previous frame; wherein the first filter has a first filter window, and a size of the first filter window is 1 row×n column, in which n is an integer greater than 1 and no greater than a number or count of columns of the first pixels in the current frame; the second filter has a second filter window, and a size of the second filter window is m row×n column, in which m is an integer greater than 1 and no greater than a number or count of rows of pixels in the previous frame, and n is an integer greater than 1 and no greater than a number or count of columns of pixels in the previous frame;
generate a denoised frame by performing, based on the interframe difference for the each first pixel in the current frame, a first noise reduction operation on the current frame, the denoised frame including a plurality of second pixels;
determine an intraframe difference for each second pixel of the plurality of second pixels in the denoised frame; and
generate a target frame by performing, based on the intraframe difference for the each second pixel in the denoised frame, a second noise reduction operation on the denoised frame.

20. A non-transitory computer readable medium storing instructions, the instructions, when executed by at least one processor, causing the at least one processor to implement a method comprising:
obtaining a current frame including a plurality of first pixels arranged in a plurality of rows and a plurality of columns;
for each first pixel of the plurality of first pixels in the current frame, determining an interframe difference between the each first pixel in the current frame and a corresponding pixel in a previous frame obtained prior to the current frame by a first filter corresponding to the current frame and a second filter corresponding to the previous frame; wherein the first filter has a first filter window, and a size of the first filter window is 1 row×n column, in which n is an integer greater than 1 and no greater than a number or count of columns of the first pixels in the current frame; the second filter has a second filter window, and a size of the second filter window is m row×n column, in which m is an integer greater than 1 and no greater than a number or count of rows of pixels in the previous frame, and n is an integer greater than 1 and no greater than a number or count of columns of pixels in the previous frame;
generating a denoised frame by performing, based on the interframe difference for the each first pixel in the current frame, a first noise reduction operation on the current frame, the denoised frame including a plurality of second pixels;
determining an intraframe difference for each second pixel of the plurality of second pixels in the denoised frame; and
generating a target frame by performing, based on the intraframe difference for the each second pixel in the denoised frame, a second noise reduction operation on the denoised frame.

* * * * *